United States Patent
Taylor et al.

(10) Patent No.: US 10,683,845 B2
(45) Date of Patent: Jun. 16, 2020

(54) MODULAR ACTIVE STRUCTURAL VIBRATION SUPPRESSION FOR WIND TURBINE BLADES

(71) Applicant: RENSSELAER POLYTECHNIC INSTITUTE, Troy, NY (US)

(72) Inventors: Keith Taylor, Troy, NY (US); Michael Amitay, Loudonville, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 15/556,854

(22) PCT Filed: Mar. 14, 2016

(86) PCT No.: PCT/US2016/022301
§ 371 (c)(1),
(2) Date: Sep. 8, 2017

(87) PCT Pub. No.: WO2016/145435
PCT Pub. Date: Sep. 15, 2016

(65) Prior Publication Data
US 2018/0045181 A1    Feb. 15, 2018

Related U.S. Application Data

(60) Provisional application No. 62/132,252, filed on Mar. 12, 2015.

(51) Int. Cl.
*F03D 7/02*     (2006.01)
*F03D 7/04*     (2006.01)
*F03D 1/06*     (2006.01)
*F03D 17/00*    (2016.01)

(52) U.S. Cl.
CPC ......... *F03D 7/0296* (2013.01); *F03D 1/0675* (2013.01); *F03D 7/022* (2013.01);
(Continued)

(58) Field of Classification Search
CPC ...... F03D 7/022; F03D 7/0224; F03D 7/0232; F03D 7/0236; F03D 7/024; F03D 7/04;
(Continued)

(56) References Cited

U.S. PATENT DOCUMENTS 8,876,064 B2 * 11/2014 Seifert ................. B64C 21/025
                                                244/208
9,109,576 B2 *  8/2015 Westergaard ......... F03D 7/0232
(Continued)

FOREIGN PATENT DOCUMENTS

EP        2442089        4/2012

OTHER PUBLICATIONS

Sareen et al., "Drag reduction using riblet film applied to airfoils for wind turbines," 49th AIAA Aerospace Sciences Meeting including the New Horizons Forum and Aerospace Exposition, Jan. 2011, pp. 1-19.
(Continued)

*Primary Examiner* — Erick R Solis
(74) *Attorney, Agent, or Firm* — Murtha Cullina LLP

(57) ABSTRACT

Systems, methods, and kits for reducing structural vibrations on wind turbine blades are provided. The actual dynamic structural conditions of a wind turbine blade can be used as a feedback mechanism. A flow control device and a sensor can be installed on a wind turbine blade, and a closed loop control system in operable communication with the flow control device and the sensor can be used to provide closed loop control.

21 Claims, 23 Drawing Sheets

(52) U.S. Cl.
CPC .......... *F03D 7/024* (2013.01); *F03D 7/0224* (2013.01); *F03D 7/0232* (2013.01); *F03D 7/0236* (2013.01); *F03D 7/042* (2013.01); *F03D 17/00* (2016.05); *F05B 2230/60* (2013.01); *F05B 2240/122* (2013.01); *F05B 2270/10* (2013.01); *F05B 2270/331* (2013.01); *F05B 2270/334* (2013.01); *F05B 2270/807* (2013.01); *F05B 2270/808* (2013.01); *Y02E 10/721* (2013.01); *Y02E 10/723* (2013.01); *Y02P 70/523* (2015.11)

(58) Field of Classification Search
CPC .......... F03D 7/042; F03D 7/043; F03D 7/044; F03D 7/045; F03D 7/046; F05B 2270/808
USPC ........................................ 123/35, 40, 41, 61
See application file for complete search history.

(56) References Cited

U.S. PATENT DOCUMENTS

| | | |
|---|---|---|
| 2004/0057828 A1 | 3/2004 | Bosche |
| 2007/0003403 A1* | 1/2007 | Pedersen ............... F03D 1/0633 415/4.1 |
| 2008/0317598 A1 | 12/2008 | Barbu et al. |
| 2009/0321555 A1 | 12/2009 | Nitzsche et al. |
| 2012/0134813 A1 | 5/2012 | Nies et al. |
| 2012/0224965 A1* | 9/2012 | Behrens .................. F03D 1/065 416/23 |
| 2015/0354536 A1* | 12/2015 | Betran Palomas ... F03D 7/0232 416/1 |

OTHER PUBLICATIONS

Nakafuji et al., "Active load control for airfoils using microtabs," Journal of Solar Energy Engineering, Nov. 2001, pp. 282-289, vol. 123.

Post et al., "Separation control using plasma actuators: dynamic stall vortex control on oscillating airfoil," AIAA Journal, Dec. 2006, pp. 3125-3135, vol. 44, No. 12.

International Search Report/Written Opinion, PCT International Application No. PCT/US2016/022301, PCT/ISA/210, PCT/ISA/237, dated Jun. 23, 2016.

* cited by examiner

MODULAR ACTIVE STRUCTURAL VIBRATION SUPPRESSION FOR WIND TURBINE BLADES

CROSS-REFERENCE TO RELATED APPLICATIONS

The present application is a national stage application of International Patent Application No. PCT/US2016/022301, filed Mar. 14, 2016, which claims the benefit of U.S. Provisional Application Ser. No. 62/132,252, filed Mar. 12, 2015, the disclosures of each of which are incorporated herein by reference in their entirety, including any figures, tables, and drawings.

BACKGROUND OF INVENTION

As wind energy production increases using large wind turbine rotor diameters, the wind turbine blades become more susceptible to atmospheric phenomena that place higher fatigue loads on the blades. This leads to structural vibrations, which directly impact the operating life of the wind turbine. Several competing technologies exist that attempt to address the issue of load variation and structural vibration during dynamic wind conditions. However, all of these systems have considerable drawbacks.

BRIEF SUMMARY

The subject invention provides novel and advantageous systems, methods, and kits for reducing structural vibrations on wind turbine blades. The actual dynamic structural conditions of a wind turbine blade can be used as a feedback mechanism. At least one flow control device and at least one sensor can be installed on a wind turbine blade, and a closed loop control system in operable communication with the at least one flow control device and the at least one sensor can be used to provide closed loop control. The deflection of the blade at a given time can be used as input into the control system, which can then determine whether and how to change the input signal (e.g., amplitude of an input voltage signal) to the at least one flow control device. Such a change in input signal can lead to a change in the deflection of the blade, which can then potentially lead to further changes in the input signal in the closed loop system with feedback.

In an embodiment, a system for reducing structural vibration on a wind turbine blade can include: at least one flow control device (FCD) configured to be installed on a wind turbine blade; and at least one sensor configured to be installed on a wind turbine blade and to measure strain thereon. The system can further include a closed loop control system in operable communication with the at least one FCD and the at least one sensor. Each FCD can be, for example, a synthetic jet, and each sensor can be, for example, a strain gauge.

BRIEF DESCRIPTION OF THE DRAWINGS

FIG. 11 shows an image of a turbine blade with tufts flow visualization, with jets on.

DETAILED DESCRIPTION

Figure 1:
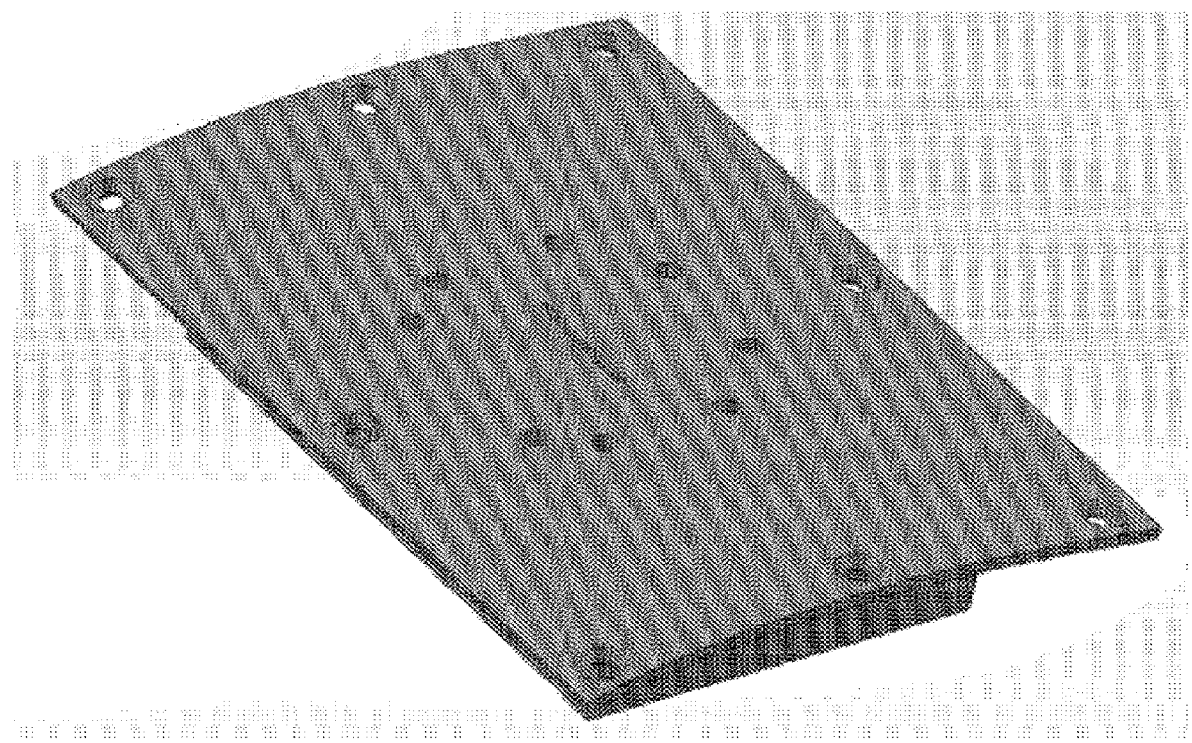
FIG. 1 shows a schematic view of a synthetic jet module that can be used in a system of the subject invention.

The subject invention provides novel and advantageous systems, methods, and kits for reducing structural vibrations on wind turbine blades. The actual dynamic structural conditions of a wind turbine blade can be used as a feedback mechanism. At least one flow control device and at least one sensor can be installed on a wind turbine blade, and a closed loop control system in operable communication with the at least one flow control device and the at least one sensor can be used to provide closed loop control. The deflection of the blade at a given time can be used as input into the control system, which can then determine whether and how to change the input signal (e.g., amplitude of an input voltage signal) to the at least one flow control device. Such a change in input signal can lead to a change in the deflection of the blade, which can then potentially lead to further changes in the input signal in the closed loop system with feedback.

Several technologies attempt to address the issue of load variation and structural vibration during dynamic wind conditions. One such technology is stall-regulated blades, which were developed in the 1980's. Prior to the development of stall-regulated blades, wind turbines employed blades that were developed for aircraft applications. Stall-regulated blades mitigated aerodynamic loads by limiting the generation of high lift in the first place. This method minimizes load variations, but at the cost of reducing potential power capture at varying wind conditions. This method is also a passive method, in that no system feedback is present. The blades in this system are fixed relative to the hub of the rotation of the turbine, and this system simply sheds load when the wind conditions reach certain critical effective angles or velocities, due to the shape of the cross section of the blade.

A turbine with pitch-regulated blades is an active system, in that wind turbine blades may have their angle adjusted through a feed forward control system. In this way, the load on the blades and on the system is regulated by reducing the effective angle of attack a blade sees during a rotation. This system relies on knowledge of the incoming wind flow field, and due to the time response of the mechanical control systems involved, short time scale fluctuations in wind velocities cannot be accounted for, and thus the time response of this system is limited.

An independent blade pitch control system is able to adjust the effective angle of each blade independently of each other. This system is still limited in its time response at effectively mitigating load variations due to short time scale wind fluctuations. There are mechanical limits to how fast this type of system is able to actuate.

Vortex generators are able to impart vorticity into the flow, and the enhanced mixing allows for flow reattachment during stall conditions. However, this approach comes with a constant drag penalty that is omnipresent. As such, when the flow conditions do not require modification, this drag penalty has the effect of reducing available power to capture, reducing the overall efficiency of a turbine.

A microtab system involves the deployment of small tabs near the trailing edge of the blade. They are able to alter the circulation around a blade, changing the effective lift and thus the effective load on a wind turbine blade. However, this system is not effective under conditions where the flow is already separated, as the tabs are located in a part of the blade where the flow conditions have already become unacceptable.

Riblets attempt to reduce drag in order to increase lift and effectively increase available power capture. They have the potential to reduce flow separation under specific circumstances, but as a passive approach, lack the ability to be incorporated into an active approach.

All of these related art systems have problems that are addressed by the systems and methods of the subject invention.

Embodiments of the present invention advantageously use the actual dynamic structural conditions of a wind turbine blade as a feedback mechanism. The use of flow control devices can reduce flow unsteadiness around a blade. However, systems and methods of the subject invention need not primarily rely on fluid state information as a feedback mechanism, but instead can rely on structural information as the controlling quantity of interest. In addition, the carrier signal used to actuate the flow control device(s) can be modulated in the frequency domain to achieve similar performance with lower energy input, similar to how pulse modulation can achieve higher efficiency.

Embodiments of the present invention reduce the amplitude of structural vibrations seen by a wind turbine blade during operation. As an analogy, if a credit card is folded in half, that action does not, in itself, break the credit card. However, if this action is repeated, back and forth, several times, eventually, the material becomes weak enough that it will break apart. Statistically, this can be predicted, but there is wide variance in how many motions it will take until the credit card breaks. If the amplitude of bending were reduced, it would take many more motions in order to break the credit card. This concept can be applied to larger structures. If a wind turbine blade bends continually during operation, even if sufficiently advanced materials are employed, in time, the blade will fail due to chronic fatigue accumulating over time.

In addition, another analogy applies. If a piece of dry, uncooked spaghetti is bent at very low rates, then it is possible to bend it to certain angles. However, if the same motion is done at a much higher rate, the spaghetti will break, due to the large impulse change in loading on the piece. Similarly, when exposed to very large, sudden changes in wind velocity (both speed and direction are important), wind turbine blades, are vulnerable to failure due to these sudden changes.

Embodiments of the present invention improve on related art methods of load mitigation, which either monitor wind conditions to actuate flow control actuators, modify the shape of the blade to reduce total load, or modify the angle of attack (the angle between the blade and the current flow direction) mechanically. Systems and methods of the subject invention can directly monitor the structural behavior of a wind turbine blade, and actuate in response to this information in a closed loop fashion. Load oscillations can be reduced during dynamic conditions in a feed forward manner. Systems and methods of the subject invention close the loop by providing direct feedback from the structure in order to reduce structural vibrations.

Reduced structural vibrations increase the lifetime of a wind turbine blade, such that a single blade is able to produce more power during its lifetime. This improves the return on investment of a blade. As long as the cost of the power required to run the system during one operational lifetime, and the cost to install and maintain the system are less than the additional revenue received from the additional time the wind turbine is operational, then the system will pay for itself (and then some).

Embodiments of the subject invention reduce structural vibration of wind turbine blades in a closed loop fashion through the actuation of flow control devices. Strain data can be obtained from one or more sensors measuring strain of the blade, and flow data can be obtained locally near the flow control device (e.g., by a flow control device or a sensor). Some or all of the data can be used to determine the voltage signal to be applied to the flow control device(s). The flow control devices can be modular units that can be placed as needed into openings on an arbitrary wind turbine blade. Feedback can be based on, for example, the amplitude of structural vibration, and flow control actuators can have a proportional response to this amplitude.

Instead of simply measuring incoming flow fields, and knowing a priori wind conditions, systems and methods of the subject invention can use the actual dynamic structural conditions of the blade as a feedback mechanism. The use of flow control devices can reduce flow unsteadiness around a blade, but systems and methods of the subject invention do not need to primarily rely on fluid state information as the feedback mechanism, but instead can rely on structural information as the controlling quantity of interest. In addition, the carrier signal used to actuate the flow control device(s) can be modulated in the frequency domain to achieve similar performance with lower energy input, similar to how pulse modulation can achieve higher efficiency. Flow control devices (e.g., modular flow control devices) can be placed along a portion of or the entire span of a wind turbine blade. A control system can receive information about the structural behavior of a blade, and then actuate the flow control devices based on the amplitude of structural load oscillation, in order to reduce these unsteady structural vibrations.

In an embodiment, a system can include a wind turbine blade, at least one flow control device (FCD) installed on the blade, at least one sensor installed on the blade for measuring strain of the blade, and a closed loop control system. The closed loop control system can be in operable communication with (e.g., through a wired connection or a wireless connection using known wireless technology) the at least one FCD and the at least one sensor. The system can include a plurality of such blades, each of which includes at least one FCD and at least one sensor installed thereon. For example, the system can include an entire wind turbine, each blade having at least one FCD and at least one sensor installed thereon. A separate closed loop control system can be included for each blade, or a single closed loop control system can be used for an entire wind turbine.

Figure 15:
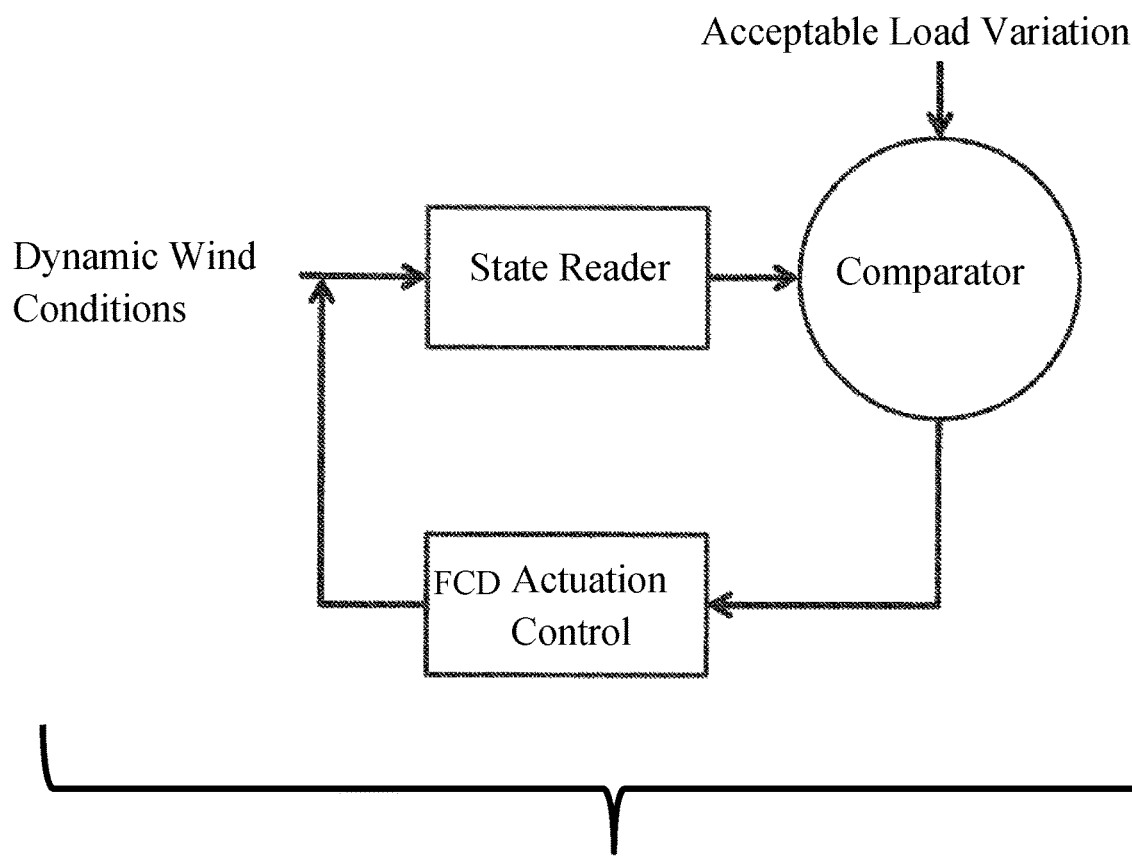
FIG. 15 shows a diagram of a closed loop control system according to an embodiment of the subject invention.
Figure 16:
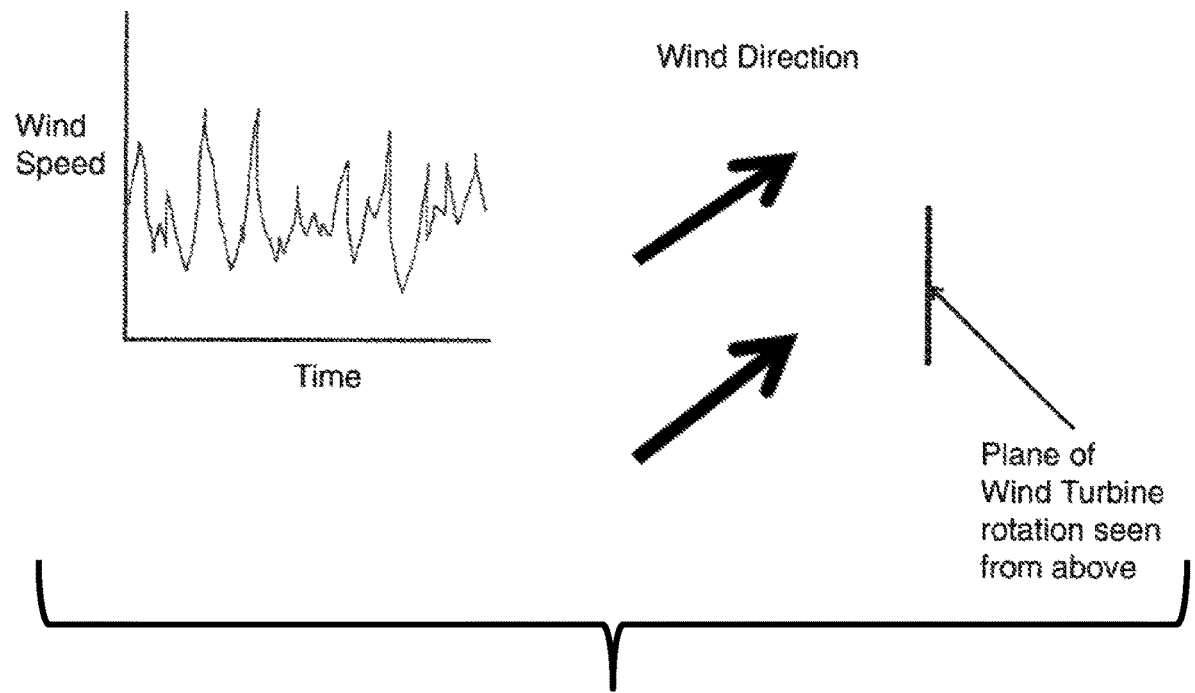
FIG. 16 shows a diagram of dynamic wind conditions experienced by a wind turbine.
Figure 17:
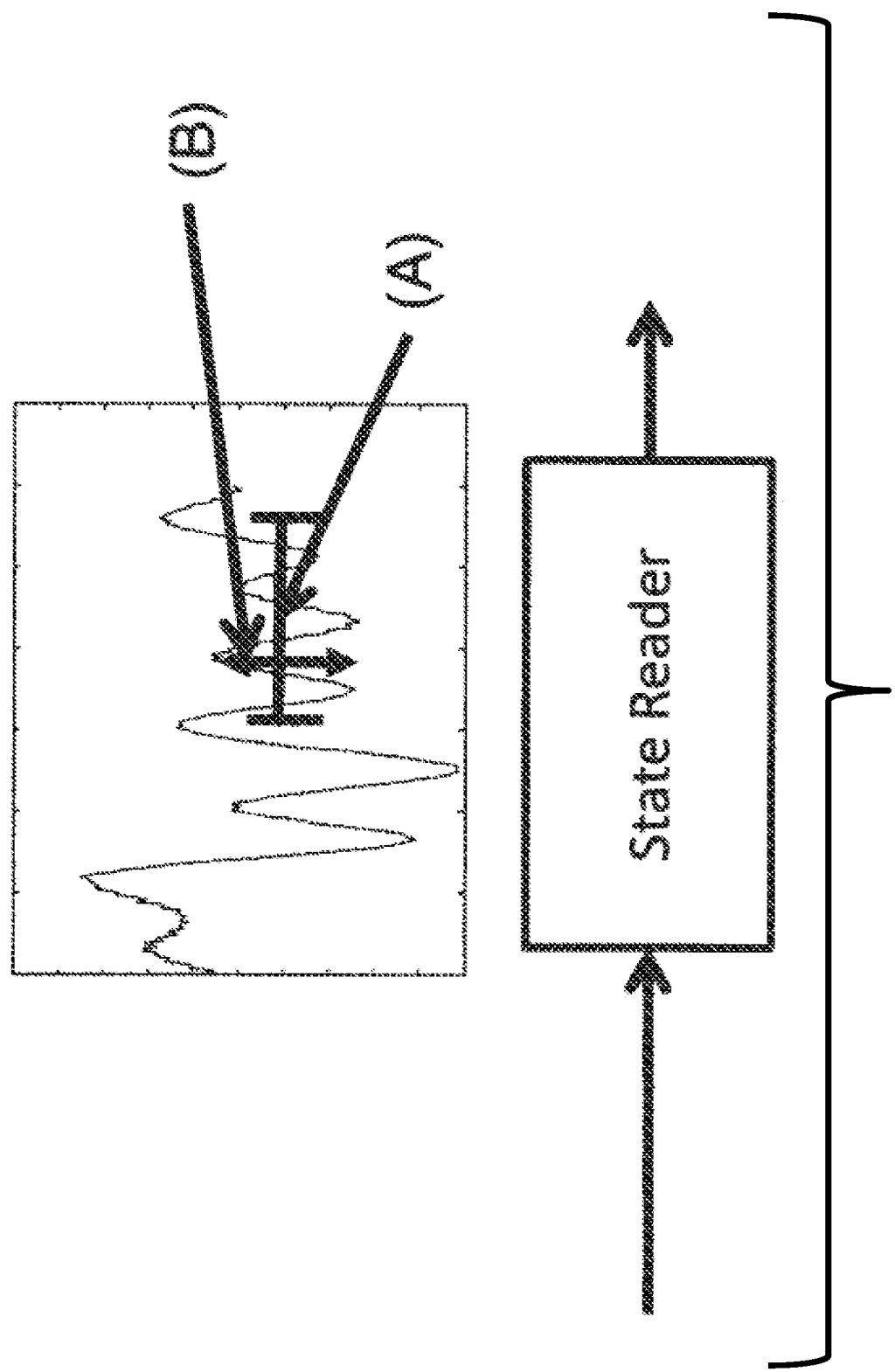
FIG. 17 is a plot of the vibration read by a state reader on a wind turbine blade; the section on the plot marked (A) can be used to establish variation from average trend, and the section marked (B) can be used for qualitatively reporting recent structural oscillation or load variation.

The closed loop control system, a conceptual diagram of which is depicted in FIG. 15, works in conjunction with the FCD(s) and the sensor(s) to achieve structural vibration reduction in the (or each) blade. The sensor(s) can provide one or more signals to the closed loop control system with information regarding the instantaneous deflection of the blade (on which the sensor(s) are installed) at the current time. The sensor(s) can also provide time history information, which may be included in the already-mentioned one or more signals or may be provided in additional one or more signals, about the amplitude of recent time deflections of the blade. The information can be provided to a controller, which can be part of the closed loop control system or separate therefrom, and the controller can increase, decrease, or keep constant the amplitude of a voltage signal provided to the FCD(s) installed on the blade on which the sensor(s) providing the information is installed. The determination to increase, decrease, or keep constant the amplitude of the voltage signal can be based on the recent time history of amplitude of oscillation of the blade, such information being included in the signal(s) received from the sensor(s).

Referring to FIG. 15, the closed loop control system can include a comparator, which has information about an acceptable load variation of a blade of a wind turbine. Such acceptable load variation information can be used (e.g., by the controller) to determine whether the FCD(s) should actuate on the blade. The comparator receives information about the dynamic wind conditions, and such information can include the current wind conditions and a time history (e.g., a recent time history) of the wind conditions. The information about the dynamic wind conditions can be received from a state reader (e.g., the sensor(s) described herein). Such information can be provided continuously as the turbine is operated. After actuation of the FCD(s), if applicable, the wind conditions may change, and such information is then provided to the comparator, and the process continues in such a closed loop fashion. For example, when a wind turbine blade has an increase in load variation in time, the system can actuate the FCD(s), leading to lower variations in load oscillation amplitude. This can be seen in FIG. 18, which is described in more detail in Example 1.

Figure 18:
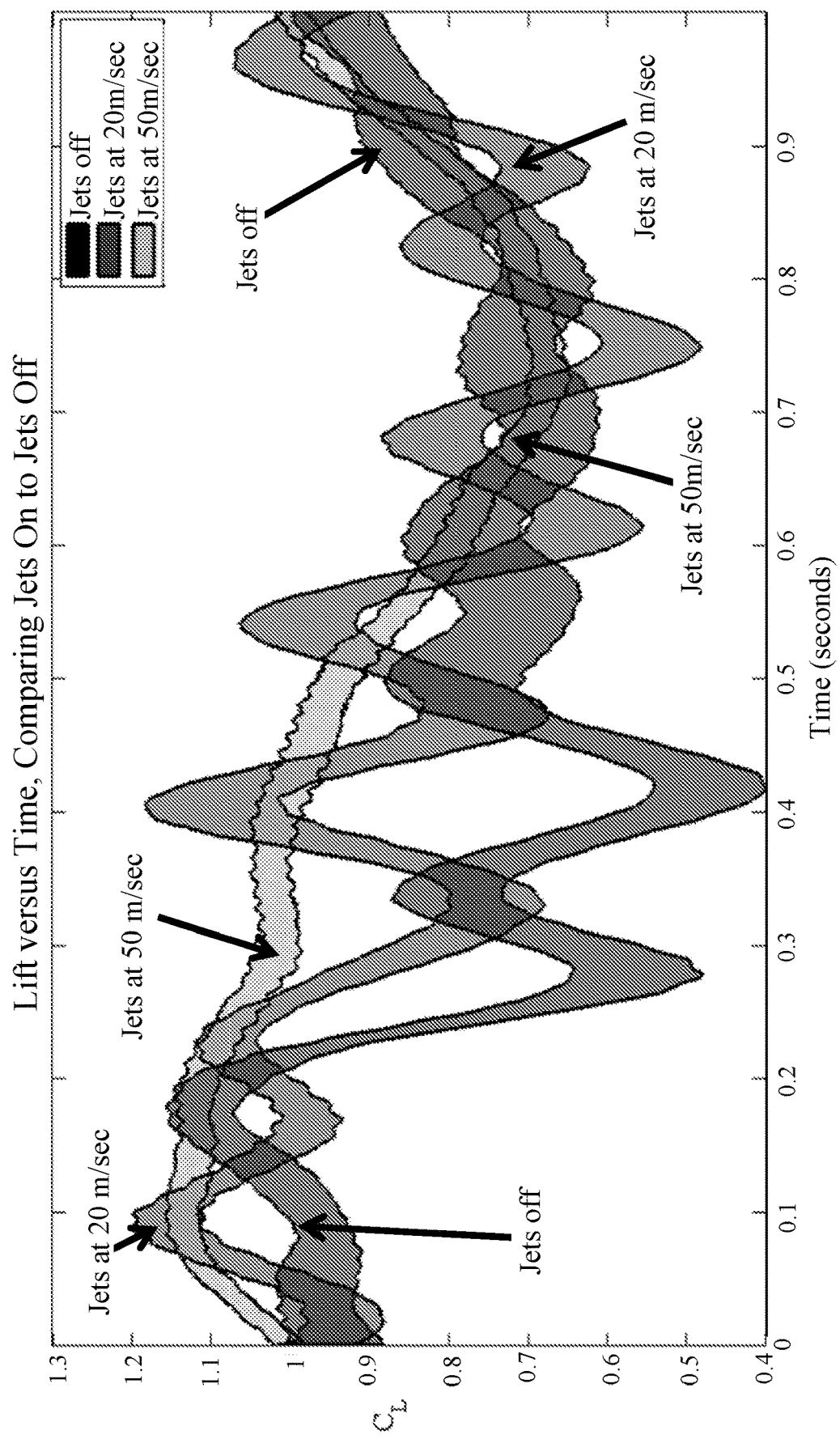
FIG. 18 shows a plot of lift versus time for a wind turbine blade with flow control devices off, flow control devices on at a first rate, and flow control devices on at a second rate; the data was obtained at dynamic pitch (k=0.035).

FIG. 18 shows a plot of the lift coefficient versus time for a wind turbine blade with FCDs off, FCDs on at a rate of 20 meters per second (m/sec), and FCDs on at a rate of 50 m/sec. Referring to FIG. 18, the blade is forced to change angle of attack in a sinusoidal fashion, and without control, there are load oscillations apparent. The data in FIG. 18 is averaged over several loops, with the average of the data plotted showing the standard deviation added and subtracted, leading to the "ribbon" appearance of the plot. This helps to graphically represent the channel along with load tends to move in a time averaged sense. It can be seen that, when FCDs are actuated, a reduction occurs in the short term variations in lift, which corresponds to loading. Thus, systems and methods of the subject invention can change the loading from the "no jets" case to the "jets at 50 m/sec" case in a closed loop fashion.

In many embodiments, one or more (e.g., all) of the FCDs present can each be a synthetic jet, which can also be referred to as a synthetic jet actuator. A synthetic jet can include a piezoelectric disk and a cavity, which is able to inject momentum into a surrounding fluid through the actuation of the disk. A synthetic jet can be powered by a voltage signal, such as a sinusoidal varying voltage signal. A sinusoidal varying voltage signal is effectively the same as alternating current, but does not necessarily have a reference to ground. The momentum injection can be achieved most effectively when the actuation frequency is chosen appropriately based on the dimensions of the cavity, taking advantage of various resonant frequencies present due to the geometry of the cavity and the geometry of the piezoelectric disk.

Though synthetic jets have been discussed in detail, each FCD can be any flow control system or device (e.g., a modular flow control system or device) that is able to impart momentum into the flow on a wind turbine blade.

Figure 12:
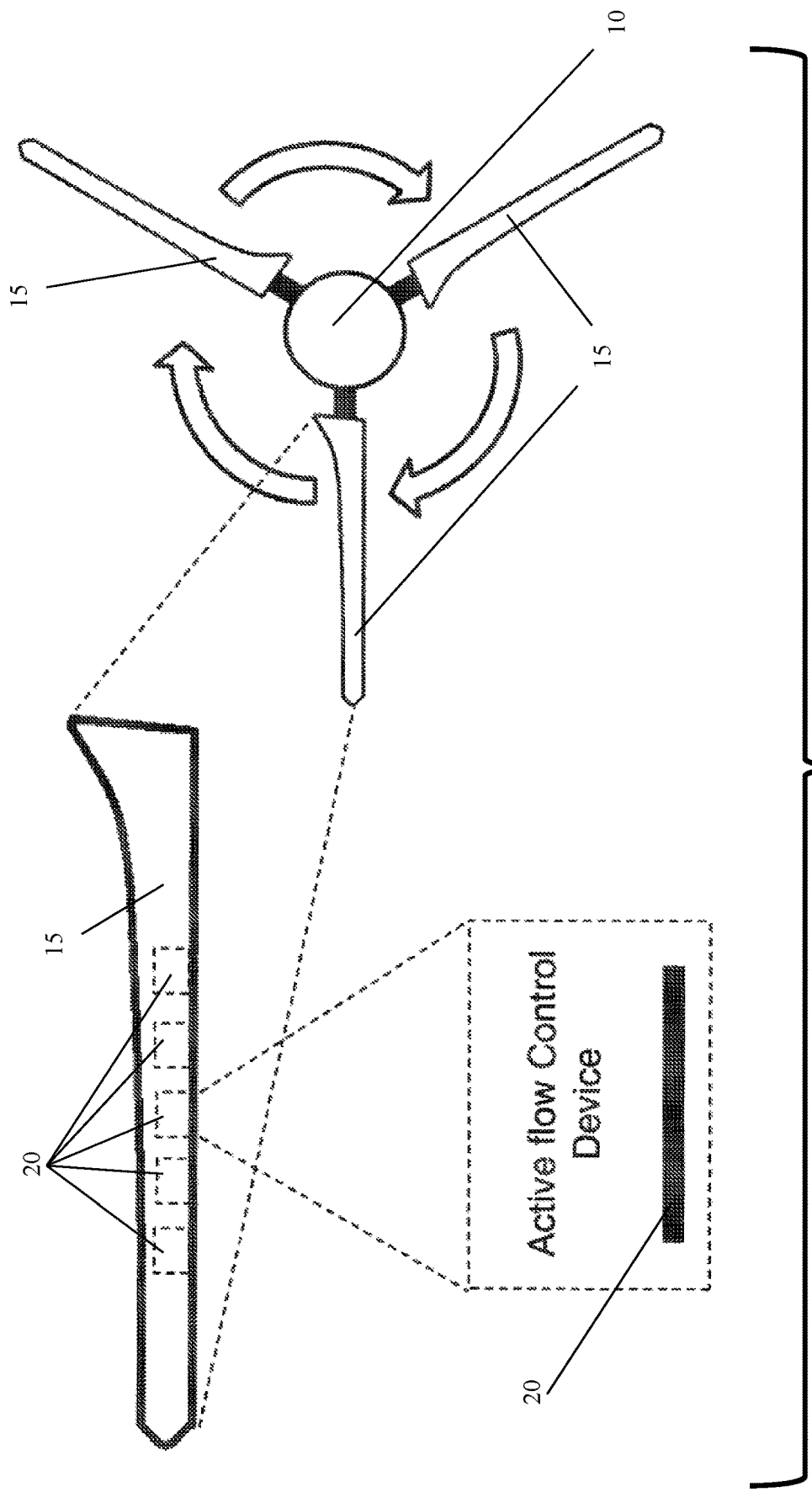
FIG. 12 shows a schematic view of a wind turbine according to an embodiment of the subject invention.

FIG. 12 shows a top view of a wind turbine 10, and has an inset of a top view of a blade 15 of the turbine 10. The blade 15 depicts five FCDs 20 on an upper surface thereof, though this is for exemplary purposes only and embodiments of the subject invention are not limited thereto. FIG.

Figure 13:
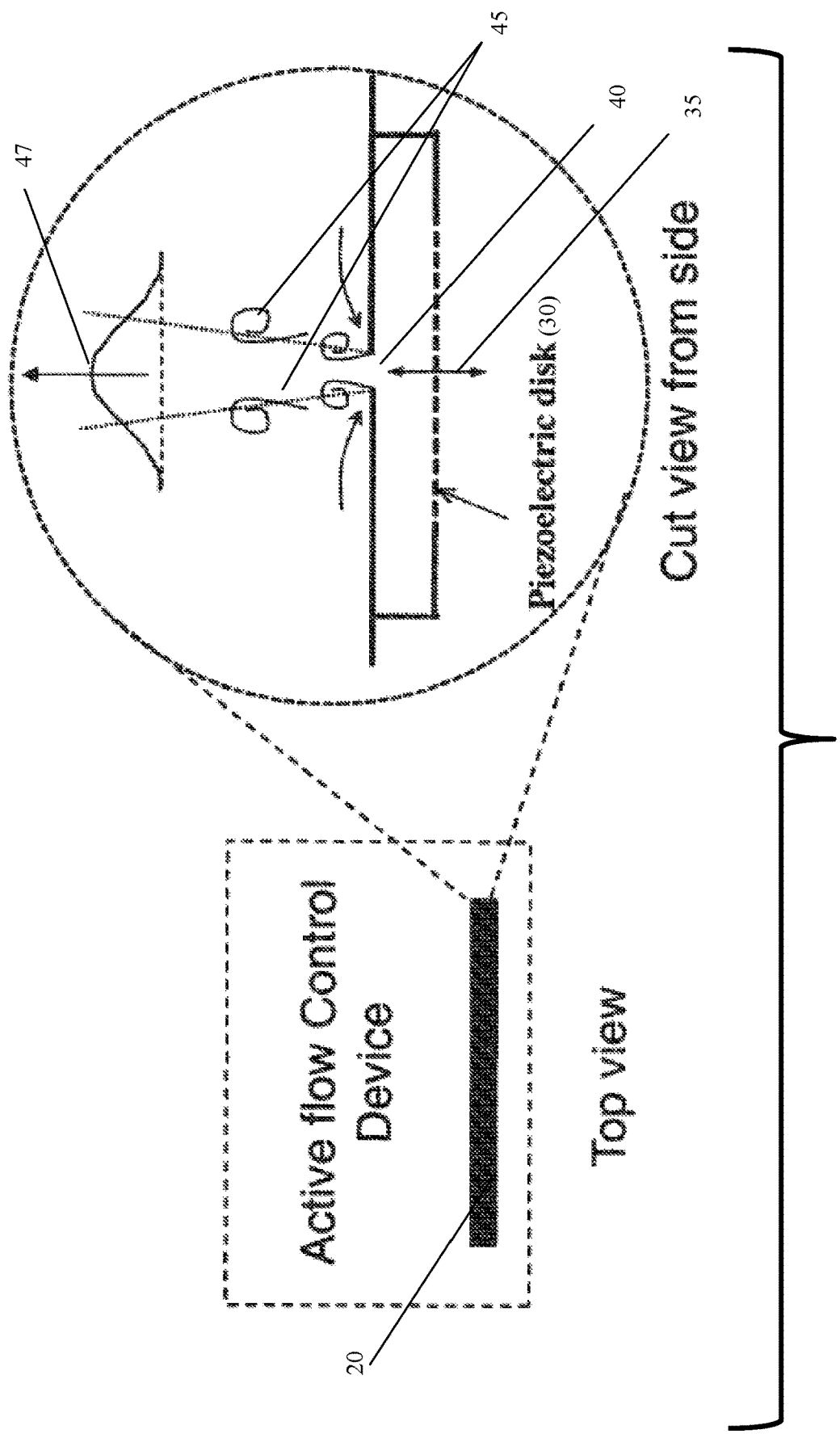
FIG. 13 shows a top view of a flow control device according to an embodiment of the subject invention.

12 includes a further inset showing a top view of one of the FCDs 20, which is similar to a block rectangular from the top view. FIG. 13 shows the same top view of a FCD 20, and a cross-sectional side view of a synthetic jet (right side). Referring to FIG. 13, the piezoelectric disk 30 can actuate up or down, depicted by the up/down double arrow 35, and this can change the amount of fluid 45 pushed out through the cavity 40. FIG. 13 also includes a small plot 47 to demonstrate the sinusoidal nature that can be present in the signal provided to the synthetic jet.

Figure 14:
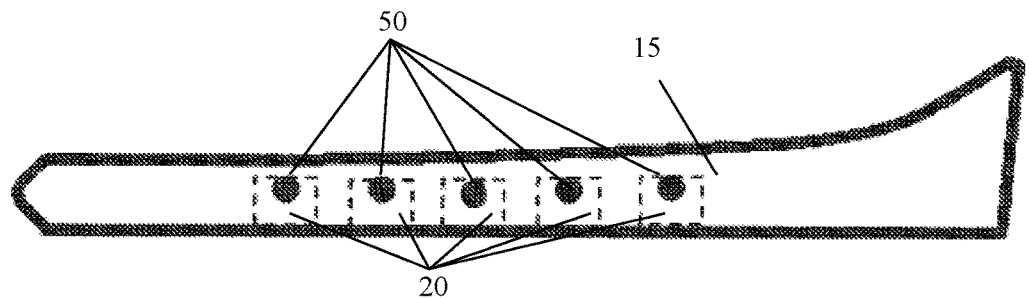
FIG. 14 shows a top view of a wind turbine blade according to an embodiment of the subject invention.

FIG. 14 shows a top view of a blade 15 having FCDs 20 on an upper surface thereof, along with sensors 50 positioned near the FCDs. Though a quantity of five FCDs 20 and five sensors 50 are shown, all of which are positioned on an upper surface of the blade 15, these depictions are for exemplary purposes only and embodiments are not limited thereto. In addition, the positioning of the sensors 50 relative to the FCDs 20 are also shown for exemplary purposes and embodiments are not limited thereto.

In many embodiments, one or more (e.g., all) of the sensors for measuring strain present can each be a strain gauge. Each strain gauge can be associated with one or more FCD. For example, each strain gauge can be associated with one FCD (e.g., on a blade of a wind turbine), which can be a synthetic jet. This strain gauge can measure the strain seen by the blade near the synthetic jet with which the gauge is associated. This can indicate how much the blade is deflecting away from the design, or desired, deflection. Several kinds of data can be provided by the strain gauge. First, the current, absolute deflection away from an acceptable deflection value (which can be predetermined) can be provided by the strain gauge. Even a high deflection away from intended design deflection may necessitate actuation of the FCD(s). Second, the amplitude of the time variance of this deflection can be provided. If the blade is moving from high to low amplitudes of deflection, even at low frequencies, actuation of the FCD(s) may mitigate the amplitude of this oscillation. Third, the derivative of the time variance of the deflection can be provided. If a very high derivative is detected, this can also be important when analyzing the state of the system. This means that there is very rapid time oscillation of loading, and thus actuation of the FCD(s) may stabilize the surrounding flow field, reducing unsteady loading on the blade. All information from the strain gauge(s) can be provided to, for example, the closed loop control system.

In many embodiments, the FCD(s) and sensor(s) (e.g., synthetic jet(s) and strain gauge(s)) can be modular. That is, they can be configured to attach to an existing blade, and can be detachable attached to such a blade. Placement of the FCD(s) and the sensor(s) can depend on the geometry of a blade, but in most cases, they need only be placed along part of a wind turbine blade. For example, the FCD(s) and sensor(s) can be placed near the tip of a blade, such as within a range of 10%-30% (of the length of the blade) away from the tip. A modular approach, where FCD(s) and sensors are only placed where needed, reduces installation costs and energy costs, while maximizing the efficiency of the system (e.g., maximizing structural vibration reduction per dollar spent). The closed loop control system can be separate from the FCD(s) and sensor(s) or can be included therewith in this modular approach.

Based on the modular approach, the subject invention also provides a kit, which can include: at least one FCD as described herein and configured to be attached to or installed on a wind turbine blade: at least one sensor as described herein and configured to be attached to or installed on a wind turbine blade. Each sensor can be associated with an FCD and can be in operable communication therewith (e.g., through a wired connection or a wireless connection using known wireless technology). In an embodiment, the kit includes an equal number of FCDs and sensors respectively associated with each other. The kit may include a closed loop control system as described herein. Alternatively, the at least one FCD and the at least one sensor can be configured to connect to a separate closed loop control system.

In some embodiments, the FCD(s) and/or the sensor(s) can be integral to a wind turbine blade. That is, they can be part of the original manufacture of the blade itself or can be permanently (not detachably) attached thereto or installed thereon.

Systems, methods, and kits of the subject invention can be introduced retroactively to currently-designed wind turbine blades, or can be used with new blades that are built to accept them. Systems, methods, and kits of the subject invention can also be incorporated into the initial stages of a design process, such that a blade can be designed from the ground up to incorporate it, leading to the development of a new wind turbine blade. It is noted that, prior to stall-regulated blades, wind turbines used airfoils that were designed for aircraft. Once the approach was taken to develop a blade specific for wind turbines, the resulting blades exhibited significantly different geometry compared to conventional aircraft airfoils. Similarly, a new wind turbine blade incorporating an embodiment of the subject invention could potentially have different geometry than that of conventional wind turbine blades in current use.

No related art closed loop aerodynamic flow control exists that uses the actual dynamics present for control. If synthetic jets are actuated at low velocities under certain conditions, the time variance of load oscillations can actually increase in certain circumstances. However, because the control system in embodiments of the subject invention can incorporate this information, it can then be designed in such a way that, as the jet strength is reduced, the time history of the strain gauges is analyzed to see if time varying loads due to dynamic stall or time varying angles of attack are still present. If they are, then the jet velocity can be maintained, in order to not allow for these oscillations to re-occur. One option in flow control is to rely on knowledge of incoming flow fields, then predict the resulting flow field and actuate accordingly. From a practical standpoint, this is a lofty goal to achieve with a low power microprocessor in real time. However, in many embodiments of the subject invention, no such information is relied upon, and instead a closed loop control system can work in conjunction with lab results to account for nonlinear effects of jet actuation as they relate to structural vibrations, and the derivative of the time dependent aerodynamic loading on the blade.

In some embodiments, one or more (e.g., all) of the sensors for measuring strain present can each be an accelerometer. Such an accelerometer can detect the motion of the blade relative to intended motion. An accelerometer can monitor the deflection of a blade, as well as the rate of change of deflection of the blade in time. It is noted that accelerometers that are not impacted by the presence of active piezoelectric materials are not available (or at least not commonly known). Thus, such an accelerometer would have to be positioned far enough away from the piezoelectric materials to not be affected. Also, if accelerometers that are not impacted by the presence of active piezoelectric materials were to become available, they could be used at any position on the blade. However, if such an accelerometer were available, it would provide an alternative feedback mechanism for this closed loop system, in that it would.

Systems, methods, and kits of the subject invention can advantageously reduce the amplitude of blade structural vibrations using active flow control techniques, such as synthetic-jet-based active flow control techniques. Aerodynamic loads can be manipulated by selectively attaching FCDs along one or more portions, or the entire span, of a wind turbine blade. A wind turbine's projected lifetime is 20 years, but the standard deviation is 5.8 years. Because of upfront costs, wind turbines take time to be profitable. Thus, when a wind turbine does not last its projected lifetime, the loss must be factored into the cost of energy. Extending the life of the blades, which is achieved by the systems, methods, and kits of the subject invention, can therefore lead to lower energy costs.

The subject invention also provides methods of reducing structural vibration of wind turbine blades. A method according to the subject invention can include providing a system or kit as described herein and using the system or the kit components as intended to reduce the structural vibration on one or more wind turbine blades.

In an embodiment of the subject invention, a method of fabricating a system as described herein can include fabricating a wind turbine blade, installing at least one FCD as described herein on the blade, and installing at least one sensor for measuring strain as described herein on the blade. This can be repeated for multiple blades (e.g., all blades in a wind turbine system).

The methods and processes described herein can be embodied as code and/or data. The software code and data described herein can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A system for reducing structural vibration on a wind turbine blade, the system comprising:

at least one flow control device (FCD) configured to be installed on a wind turbine blade; and at least one sensor configured to be installed on a wind turbine blade and to measure strain thereon.

Embodiment 2

The system according to embodiment 1, further comprising a closed loop control system in operable communication with (e.g., through a wired connection or a wireless connection using known wireless technology) the at least one FCD and the at least one sensor.

Embodiment 3

The system according to embodiment 2, wherein the closed loop control system comprises a comparator for comparing information received from the at least one sensor to stored information about an acceptable load variation (e.g., predetermined information about an acceptable load variation) of a wind turbine blade.

Embodiment 4

The system according to any of embodiments 2-3, wherein the closed loop control system (further) comprises a controller for controlling an input signal provided to the at least one FCD.

Embodiment 5

The system according to embodiment 4, wherein the input signal is an amplitude of an input voltage.

Embodiment 6

The system according to any of embodiments 4-5, wherein the controller controls the input signal by increasing it, decreasing it, or keeping it steady depending on information received (e.g., from a comparator of the closed loop control system).

Embodiment 7

The system according to any of embodiments 1-6, further comprising a wind turbine blade on which the at least one FCD is installed and the at least one sensor is installed.

Embodiment 8

The system according to embodiment 7, comprising a plurality of wind turbine blades, each having at least one FCD and at least one sensor installed thereon.

Embodiment 9

The system according to embodiment 8, further comprising a wind turbine having the plurality of wind turbine blades.

Embodiment 10

The system according to any of embodiments 1-9, wherein at least one of the at least one FCDs is a synthetic jet.

Embodiment 11

The system according to any of embodiments 1-9, wherein each FCD is a synthetic jet.

Embodiment 12

The system according to any of embodiments 1-10, wherein at least one of the at least one FCDs is a vortex generator.

Embodiment 13

The system according to any of embodiments 1-9, wherein each FCD is a vortex generator.

Embodiment 14

The system according to any of embodiments 10-11, wherein the synthetic jet comprises a piezoelectric disk and a cavity, and is capable of injecting momentum into a surrounding fluid through actuation of the disk.

Embodiment 15

The system according to any of embodiments 10-11 or 14, wherein the synthetic jet is powered by a voltage signal (e.g., a sinusoidal varying voltage signal).

Embodiment 16

The system according to any of embodiments 1-15, wherein at least one of the at least one sensors is a strain gauge.

Embodiment 17

The system according to any of embodiments 1-15, wherein each sensor is a strain gauge.

Embodiment 18

The system according to any of embodiments 1-16, wherein at least one of the at least one sensors is an accelerometer.

Embodiment 19

The system according to any of embodiments 1-15, wherein each sensor is an accelerometer.

Embodiment 20

The system according to any of embodiments 1-19, comprising an equal number of FCDs and sensors.

Embodiment 21

The system according to embodiment 20, wherein each sensor corresponds to and is in operable communication with (e.g., through a wired connection or a wireless connection using known wireless technology) an FCD, respectively.

Embodiment 22

The system according any of embodiments 1-21, wherein the actuation frequency of the at least one FCD is chosen appropriately based on the dimensions of the cavity of the at least one FCD (e.g., taking advantage of various resonant frequencies present due to the geometry of the cavity and/or the geometry of the piezoelectric disk of the FCD, if present).

Embodiment 23

The system according to any of embodiments 2-22, wherein the at least one sensor provides information about the instantaneous deflection of the blade (on which the sensor(s) are installed) to the closed loop control system.

Embodiment 24

The system according to any of embodiments 2-23, wherein the at least one sensor provides time history information about the amplitude of recent time deflections of the blade to the closed loop control system.

Embodiment 25

The system according to any of embodiments 2-24, wherein the at least one sensor provides information about the derivative of the time variance of the deflection of the blade to the closed loop control system.

Embodiment 26

The system according to any of embodiments 2-25, wherein the at least one sensor provides information continuously to the closed loop control system.

Embodiment 27

The system according to any of embodiments 2-26, wherein the closed loop control system uses information provided by the at least one sensor to determine whether and how much to change an input signal to the at least one FCD.

Embodiment 28

The system according to any of embodiments 2-27, wherein, if a wind turbine blade has an increase in load variation in time, the closed loop control system actuates the at least one FCD such that lower variations in load oscillation amplitude result.

Embodiment 29

A kit comprising any of the elements or features recited in any of embodiments 1-28.

Embodiment 30

A method for reducing structural vibration on a wind turbine blade, the system comprising:
installing the system of any of embodiments 1-28 on a wind turbine blade (or each blade on a wind turbine); and
using the system to reduce structural vibration on the wind turbine blade(s).

Embodiment 31

A method for reducing structural vibration on a wind turbine blade, the system comprising:

installing the components of the kit of embodiment 29 on a wind turbine blade (or each blade on a wind turbine); and using the components of the kit to reduce structural vibration on the wind turbine blade(s).

Embodiment 32

The system, kit, or method according to any of embodiments 1-31, wherein a carrier signal used to actuate the at least one FCD is modulated in the frequency domain (e.g., by a controller, which can be part of the closed loop control system, if present).

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

A simulation was run for a wind turbine system as described herein, using synthetic jets as FCDs and strain gauges as sensors on the blades. The closed loop control system was also present in the simulated system. FIG. 18 shows a plot of lift versus time for the wind turbine blade with flow control devices off, flow control devices on at 20 m/sec, and flow control devices on at 50 m/sec; the data was obtained at dynamic pitch (k=0.035).

Referring to FIG. 18, the blade is forced to change angle of attack in a sinusoidal fashion, and without control, there are load oscillations apparent. The data in FIG. 18 is averaged over several loops, with the average of the data plotted showing the standard deviation added and subtracted, leading to the "ribbon" appearance of the plot. This helps to graphically represent the channel along with load tends to move in a time averaged sense. It can be seen that, when FCDs are actuated, a reduction occurs in the short term variations in lift, which corresponds to loading.

Figure 19:
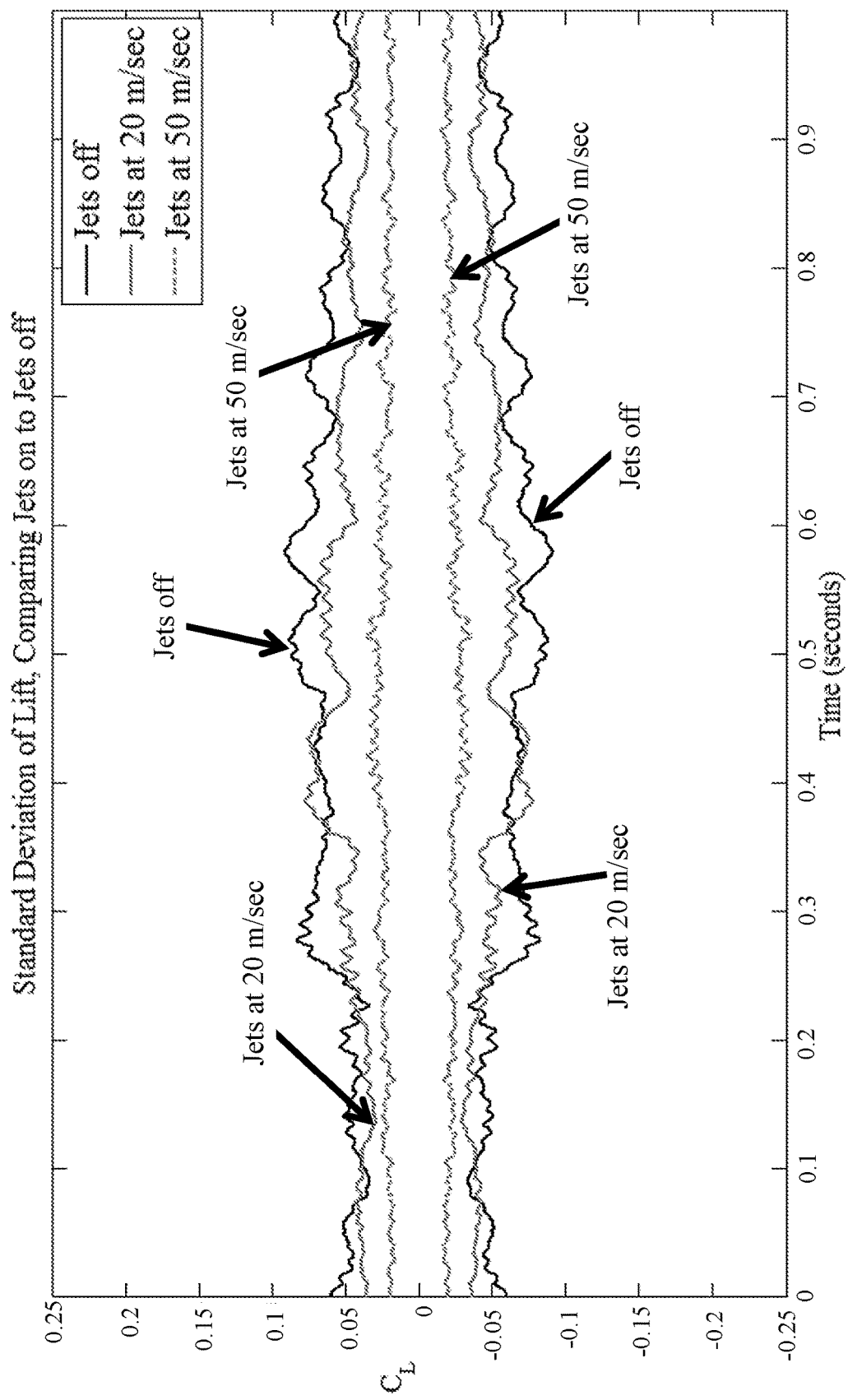
FIG. 19 shows a plot of the standard deviation of lift versus time for a wind turbine blade with flow control devices off, flow control devices on at a first rate, and flow control devices on at a second rate; the data was obtained at dynamic pitch (k=0.035).

FIG. 19 shows a plot of the standard deviation of lift versus time for this simulation. Referring to FIG. 19, the standard deviation is the smallest when the FCDs were on at 50 m/sec, next smallest when the FCDs were on at 20 m/sec, and largest when the FCDs were off.

Example 2

Figure 20A:
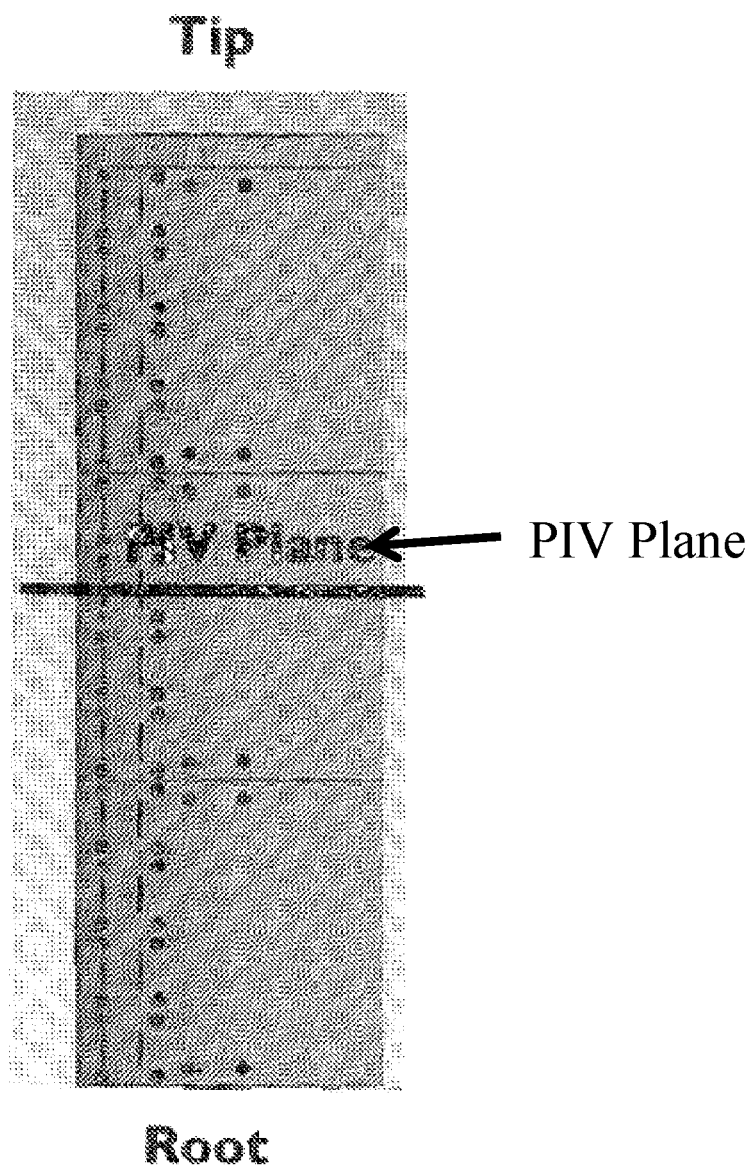
FIG. 20A shows a schematic view of a turbine blade and the PIV plane used for particle image velocimetry (NV).
Figure 20B:
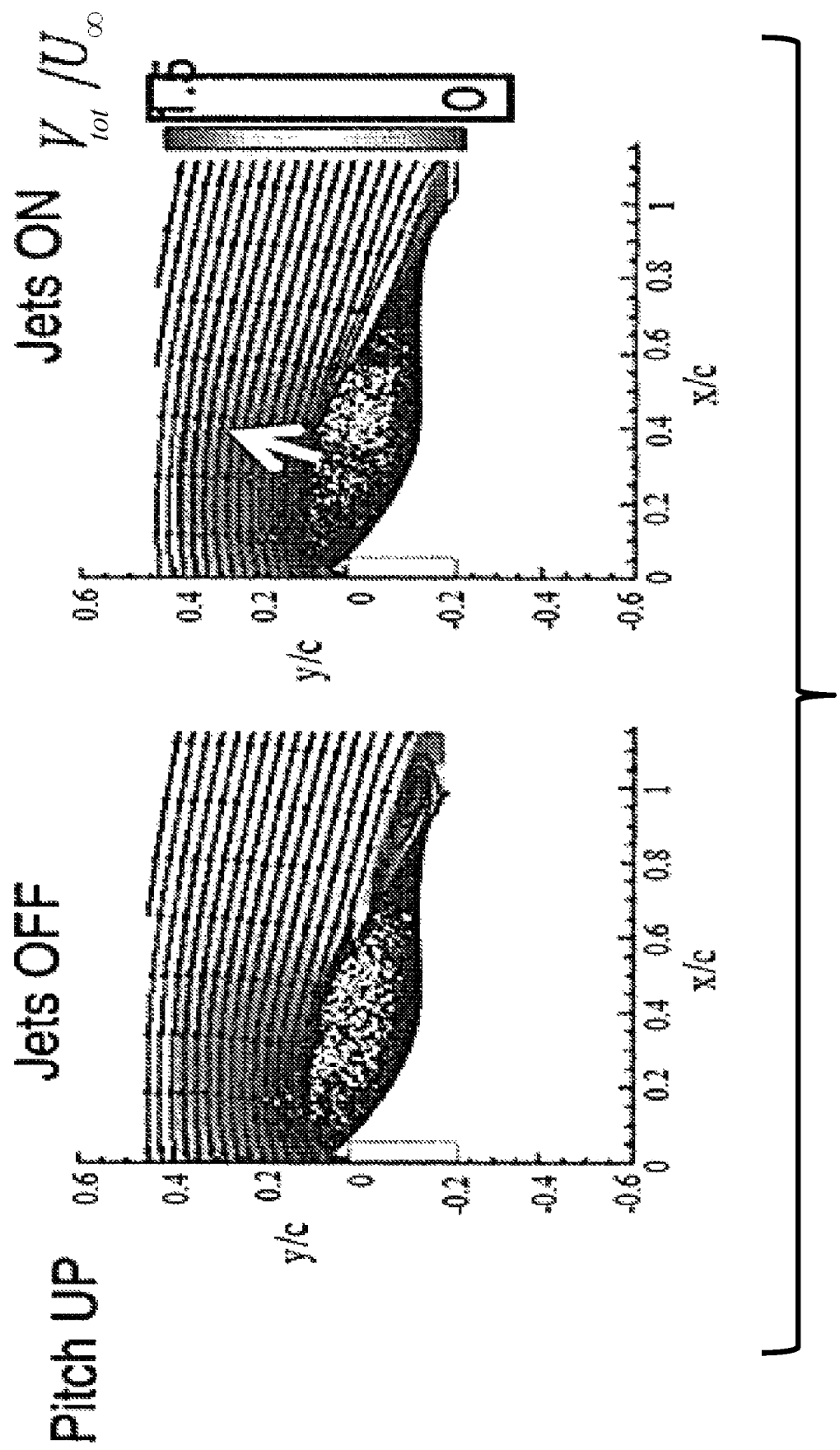
FIG. 20B shows a plot of the PIV run for jets off (left plot) and jets on (right plot) for pitch down, using the PIV plane depicted in FIG. 20A; the PIV data were $\alpha=14°$, $Re_c=222,000$, and dynamic pitch, and the dynamic pitch parameters were $\bar{\alpha}=14°$, $\alpha_A=5.5°$, and $k_f=4.8\times10^{-3}$.
Figure 20C:
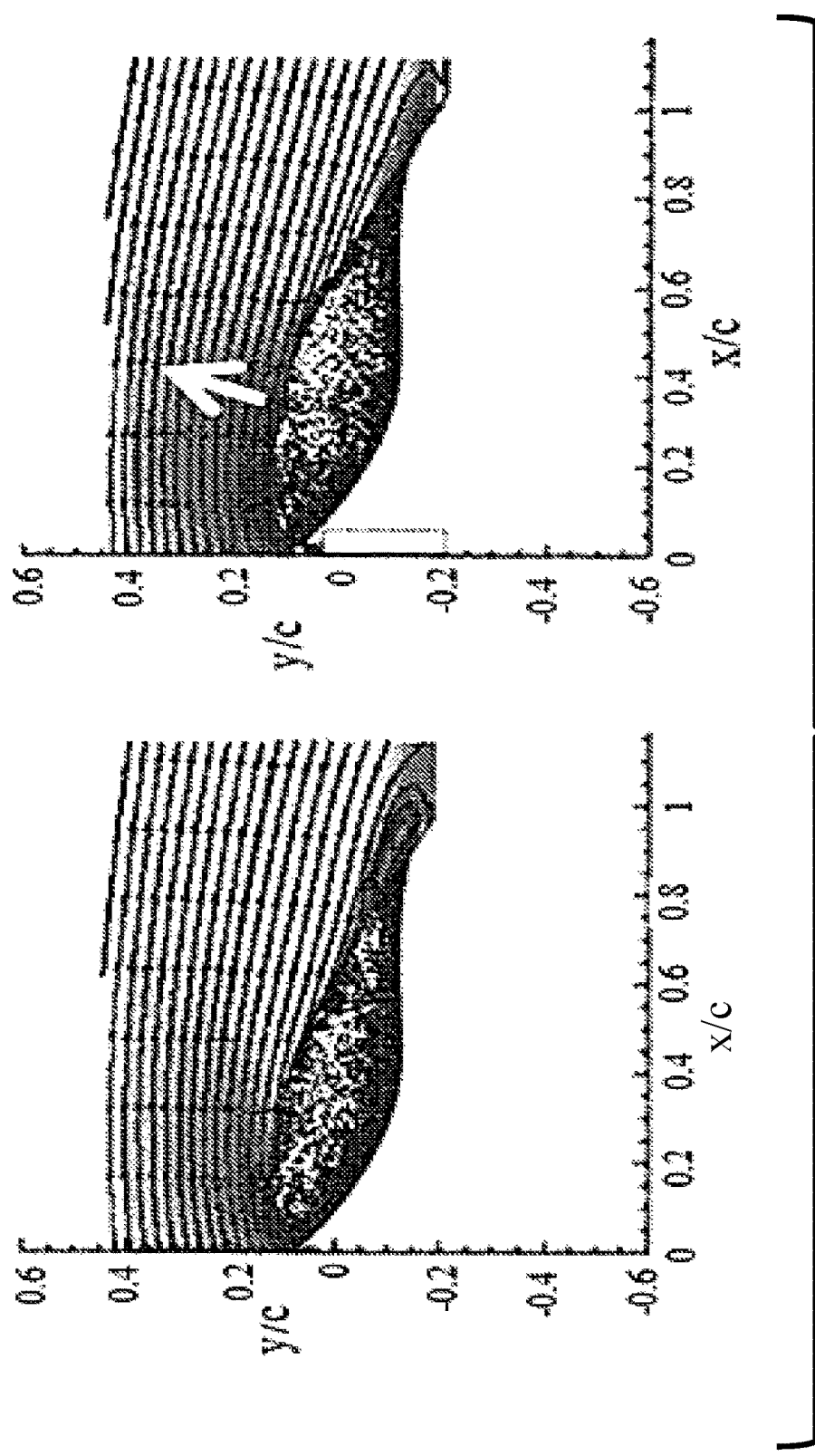
FIG. 20C shows a plot of the PIV run for jets off (left plot) and jets on (right plot) for pitch up, using the PIV plane depicted in FIG. 20A; the PIV data and the dynamic pitch parameters were the same as for FIG. 20B.

A Particle image velocimetry (PIV) simulation was run for the turbine system simulated in Example 1. FIG. 20A shows a schematic view of the turbine blade and the PIV plane used to obtain the plots in FIGS. 20B and 20C. FIG. 20B shows a plot of the PIV run for jets off (left plot) and jets on (right plot) for pitch down, using the PIV plane depicted in FIG. 20A; the PIV data were $\alpha=14°$, $Re_c=222,000$, and dynamic pitch, and the dynamic pitch parameters were $\bar{\alpha}=14°$, $\alpha_A=5.5°$, and $k_f=4.8\times10^{-3}$. FIG. 20C shows a plot of the PIV run for jets off (left plot) and jets on (right plot) for pitch up, using the PIV plane depicted in FIG. 20A; the PIV data and the dynamic pitch parameters were the same as for FIG. 20B. In FIGS. 20B and 20C, c is the chord length of the model, so that X/c is the normalized chord-wise position, and Y/c is the normalized location orthogonal to the chord orientated at zero degrees angle of attack.

Figure 21A:
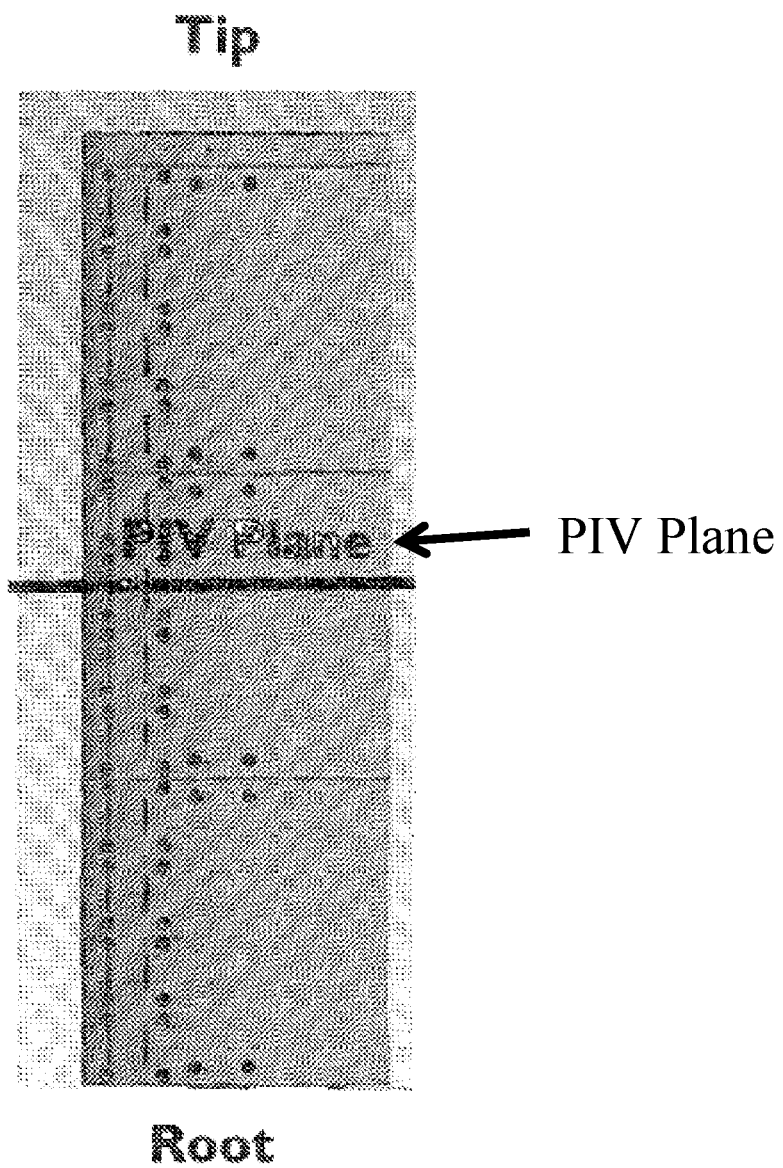
FIG. 21A shows a schematic view of a turbine blade and the PIV plane used for PIV.
Figure 21B:
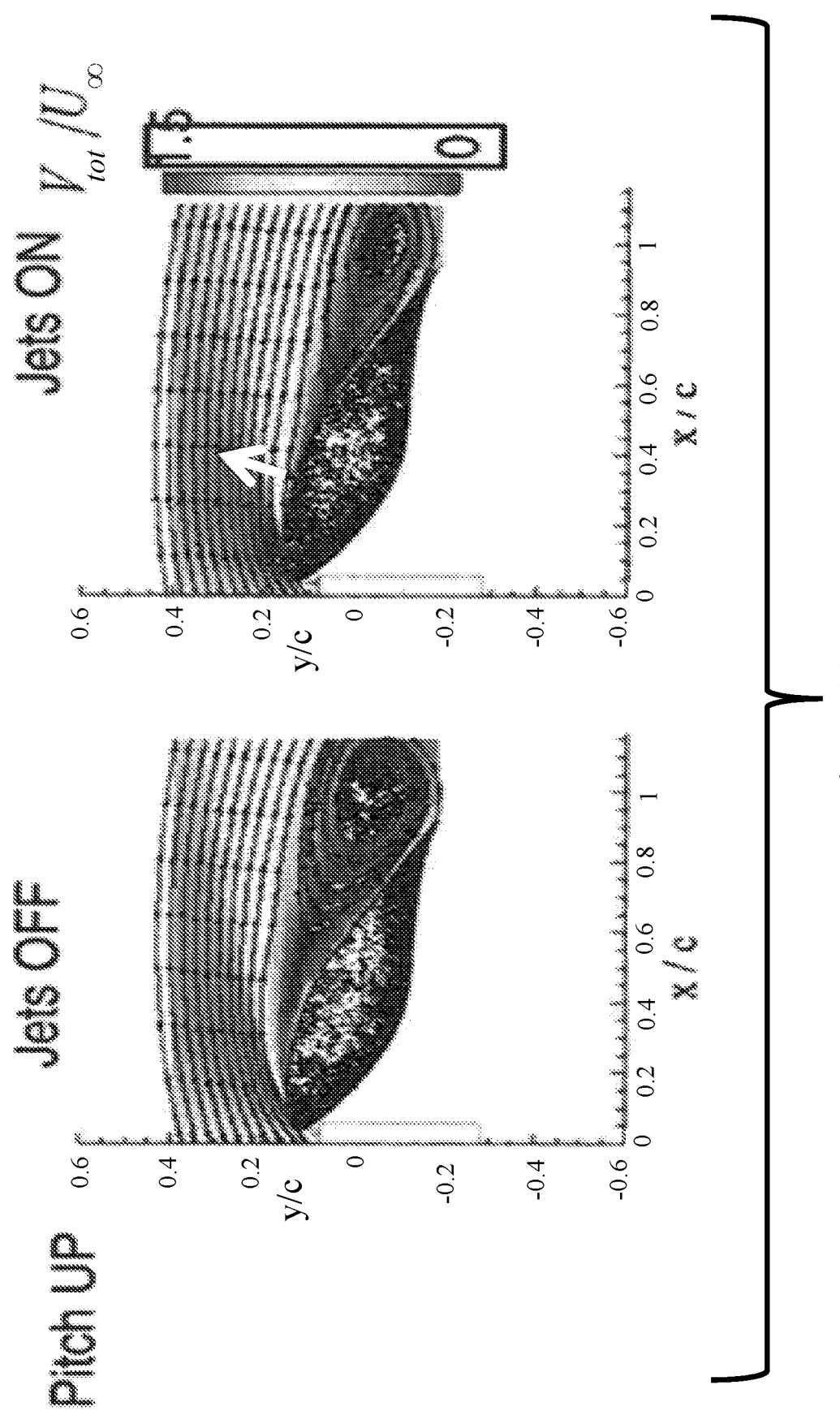
FIG. 21B shows a plot of the PIV run for jets off (left plot) and jets on (right plot) for pitch down, using the PIV plane depicted in FIG. 21A; the PIV data were $\alpha=19°$, $Re_c=222,000$, and dynamic pitch, and the dynamic pitch parameters were $\bar{\alpha}=14°$, $\alpha_A=5.5°$, and $k_f=4.8\times10^{-3}$.
Figure 21C:
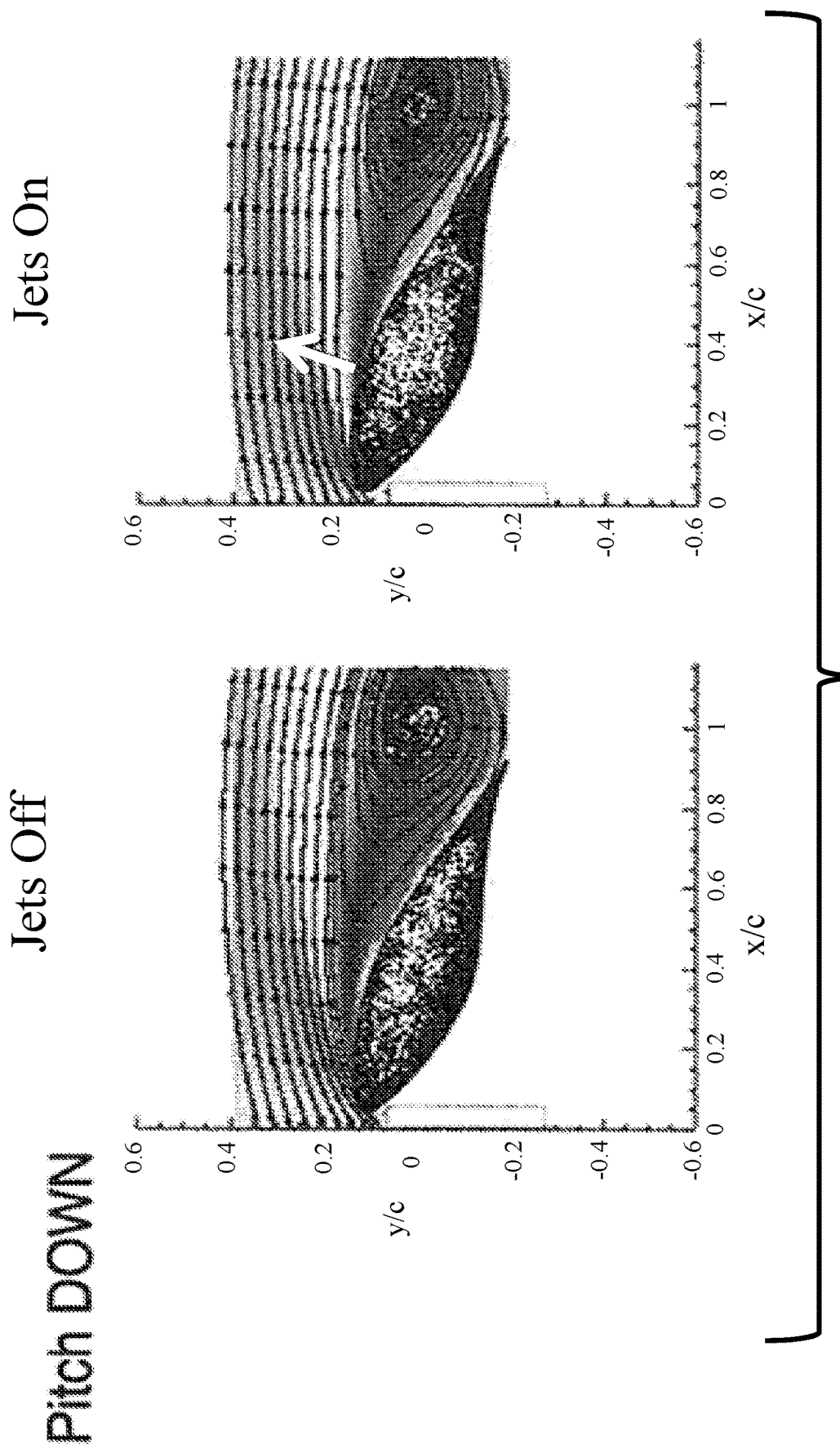
FIG. 21C shows a plot of the PIV run for jets off (left plot) and jets on (right plot) for pitch up, using the PIV plane depicted in FIG. 21A; the PIV data and the dynamic pitch parameters were the same as for FIG. 21B.
Figure 22A:
FIGS. 22A-22D are images of tuft flow visualization showing flow separation at an arbitrary location during turbine rotation.
Figure 22B:
Figure 22C:
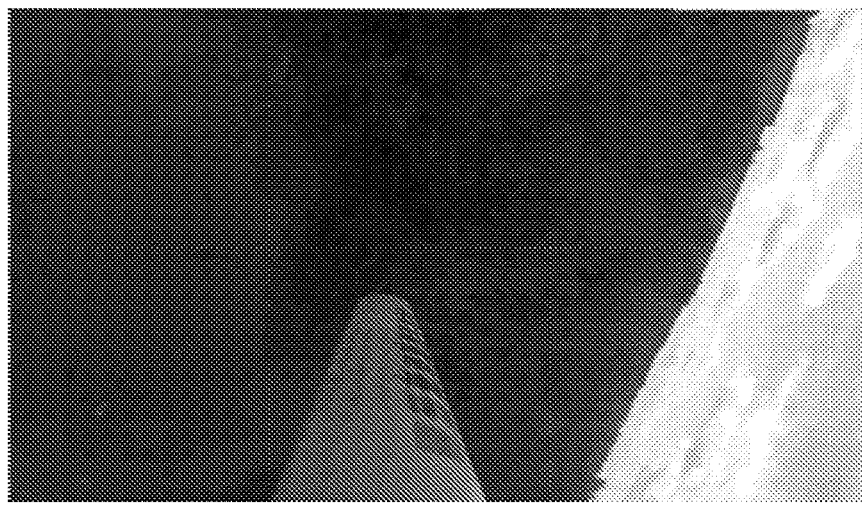
Figure 22D:
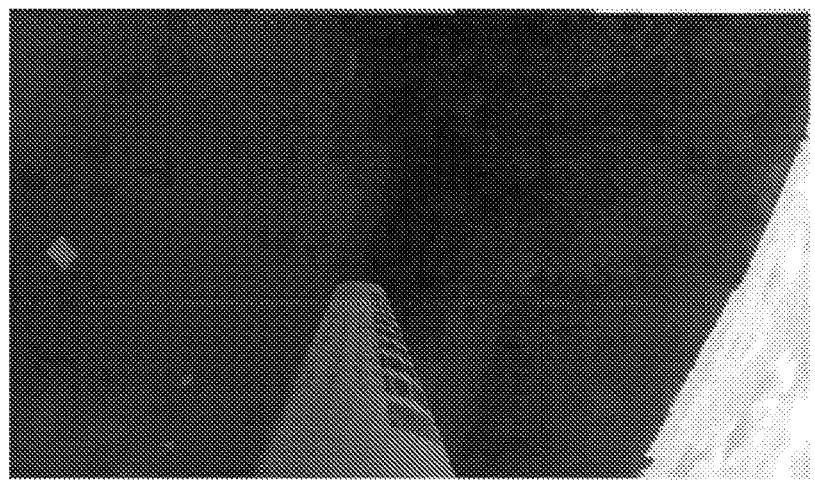
Figure 23A:
FIGS. 23A-23D are images of tuft flow visualization showing how flow control suppressed separation during turbine rotation.
Figure 23B:
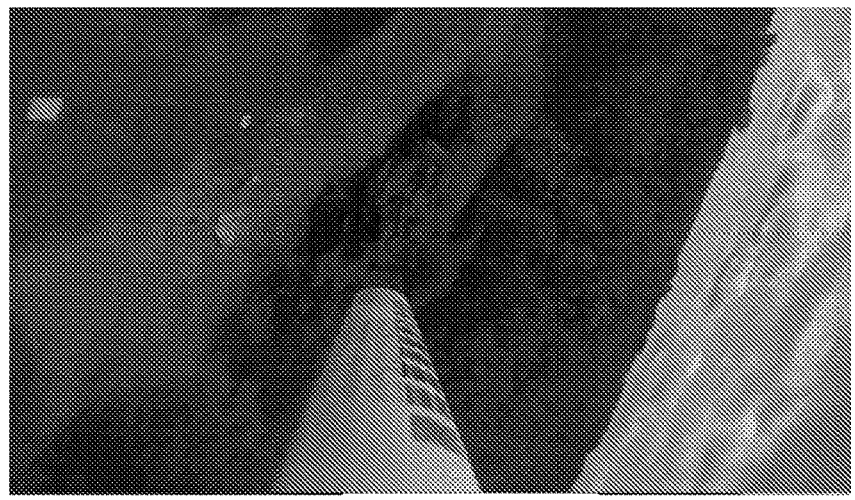
Figure 23C:
Figure 23D:

FIG. 21A shows a schematic view of the turbine blade and the PIV plane used to obtain the plots in FIGS. 21B and 21C.

FIG. 21B shows a plot of the PIV run for jets off (left plot) and jets on (right plot) for pitch down, using the PIV plane depicted in FIG. 21A; the PIV data were $\alpha=19°$, $Re_c=222,000$, and dynamic pitch, and the dynamic pitch parameters were $\bar{\alpha}=14°$, $\alpha_A=5.5°$, and $k_f=4.8\times10^{-3}$. FIG. 21C shows a plot of the PIV run for jets off (left plot) and jets on (right plot) for pitch up, using the PIV plane depicted in FIG. 21A; the PIV data and the dynamic pitch parameters were the same as for FIG. 21B. In FIGS. 21B and 21C, c is the chord length of the model, so that X/c is the normalized chord-wise position, and Y/c is the normalized location orthogonal to the chord orientated at zero degrees angle of attack.

Example 3

A wind turbine system as described herein was designed, fabricated, and instrumented. Active flow control (AFC) modules (i.e., FCDs) were installed on blades that were mounted on a 10 kW Bergey Excel-S wind turbine on the campus of Rensselaer Polytechnic Institute (RPI) in Troy, N.Y., USA. One turbine blade had synthetic jet modules installed, one turbine blade had other vortex generators installed, and the third blade was the control blade and had no FCDs installed but had provisions for adding weight to balance the wind turbine assembly.

Figure 2:
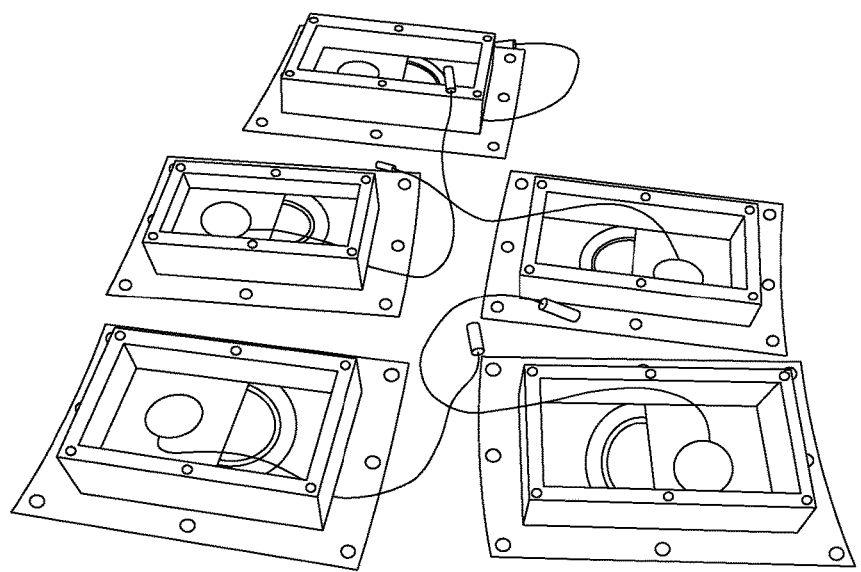
FIG. 2 shows an image of synthetic jets that can be used in a system of the subject invention.
Figure 3:
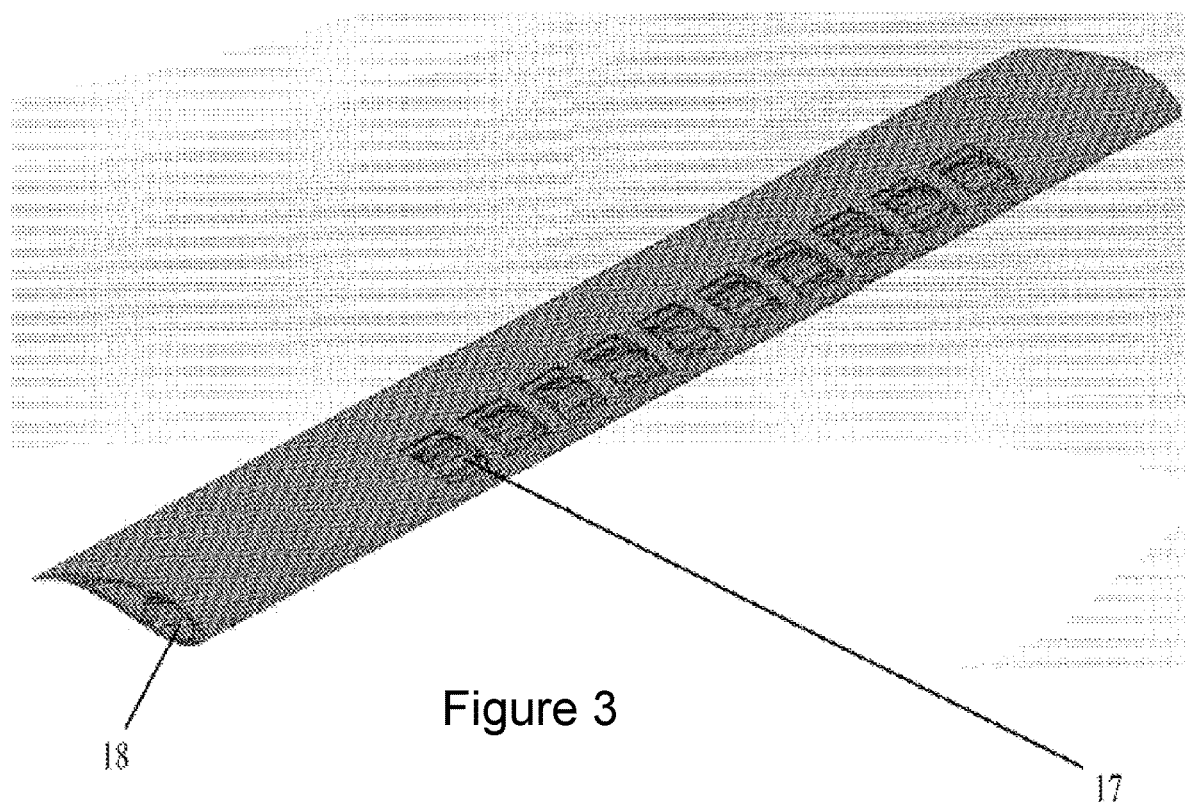
FIG. 3 shows a schematic view of a turbine blade that can be used in a system of the subject invention.

The modules were incorporated into the existing blade design for the 10 kW Bergey wind turbine. The modules for the synthetic jets, a view of which is depicted in FIG. 1, were installed on the turbine. Bench testing was performed on the synthetic jet modules, and velocity and frequency measurements at the orifice were quantified. The measurements were satisfactory, and six synthetic jet modules were manufactured. FIG. 2 shows an image of some of the synthetic jet modules used. To incorporate FCDs into the blades, new blades were obtained and modified as depicted seen in FIG. 3. The blades included a cavity 18 and cutouts 17 for the FCDs. A Labview program was created whereby the FCD modules were activated in response to a signal generated and recorded at the strain gauges mounted at the root of the wind turbine blade.

Figure 4:
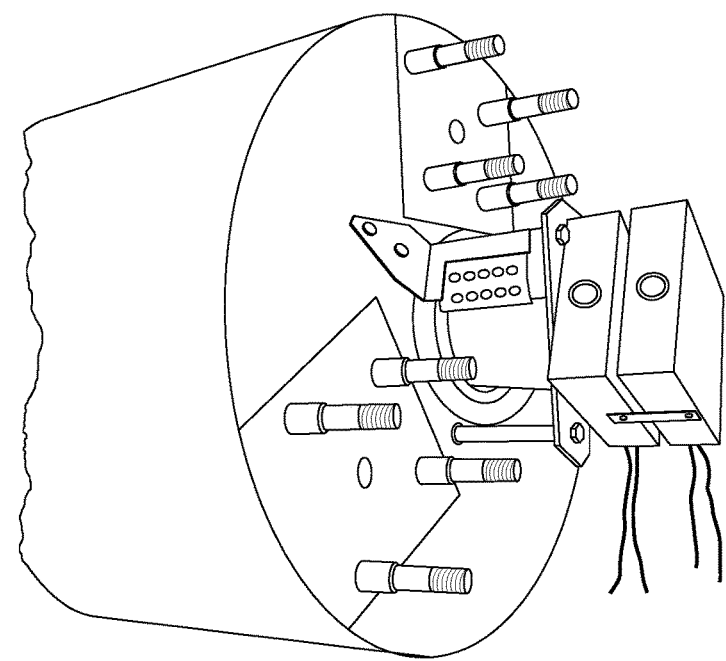
FIG. 4 shows an image of a compact DAQ chassis mounted to a wind turbine.
Figure 5:
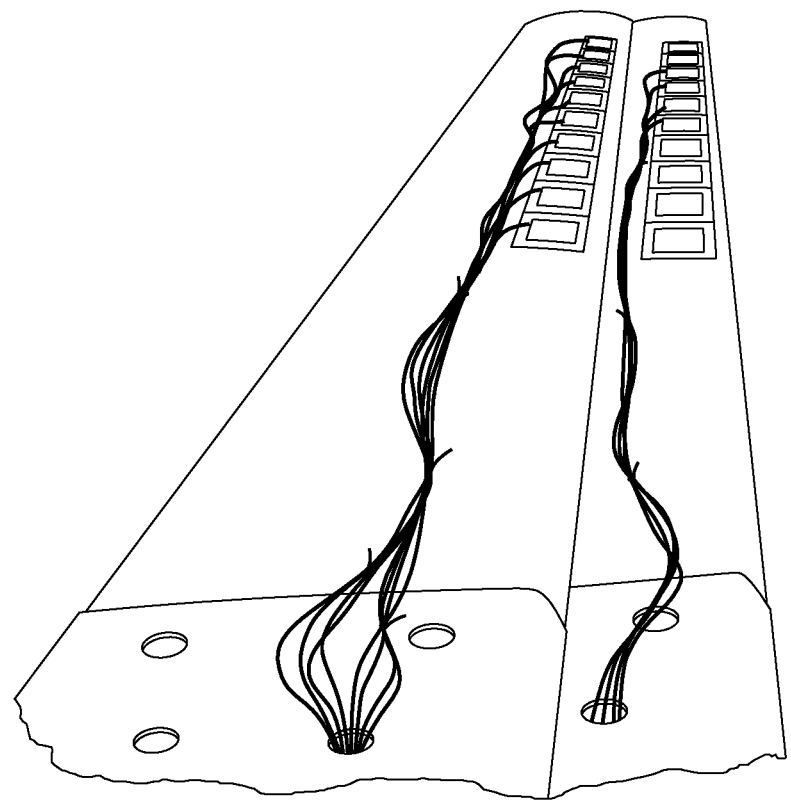
FIG. 5 shows an image of a turbine blade according to an embodiment of the subject invention.
Figure 6:
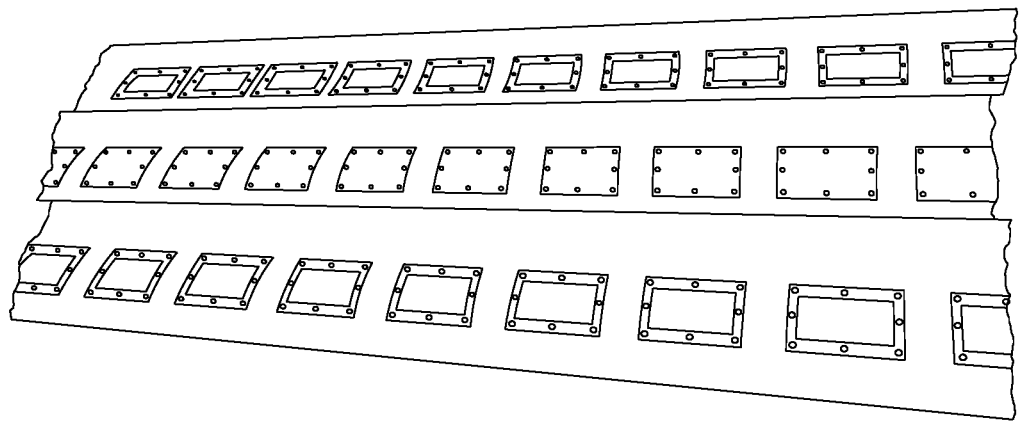
FIG. 6 shows an image of a portion of a turbine blade according to an embodiment of the subject invention, with synthetic jets (at the bottom section, as depicted in FIG. 6) and vortex generators (at the top section, as depicted in FIG. 6) installed in the blade.

The wind turbine was lowered, and the hub and tail support were transported to the lab at the RPI Center for Flow Physics and Control. A 20-channel slip ring from the Wendon Company was used to allow data and power to flow to the rotating portion of the turbine. The National Instruments compact DAQ (cDAQ) chassis was mounted to the wind turbine on a steel plate located under the nose cone, as seen in the image of FIG. 4. The wiring of the slip ring and modules was completed in the lab, and the entire system was reassembled, as depicted in the images of FIGS. 5 and 6.

Figure 7:
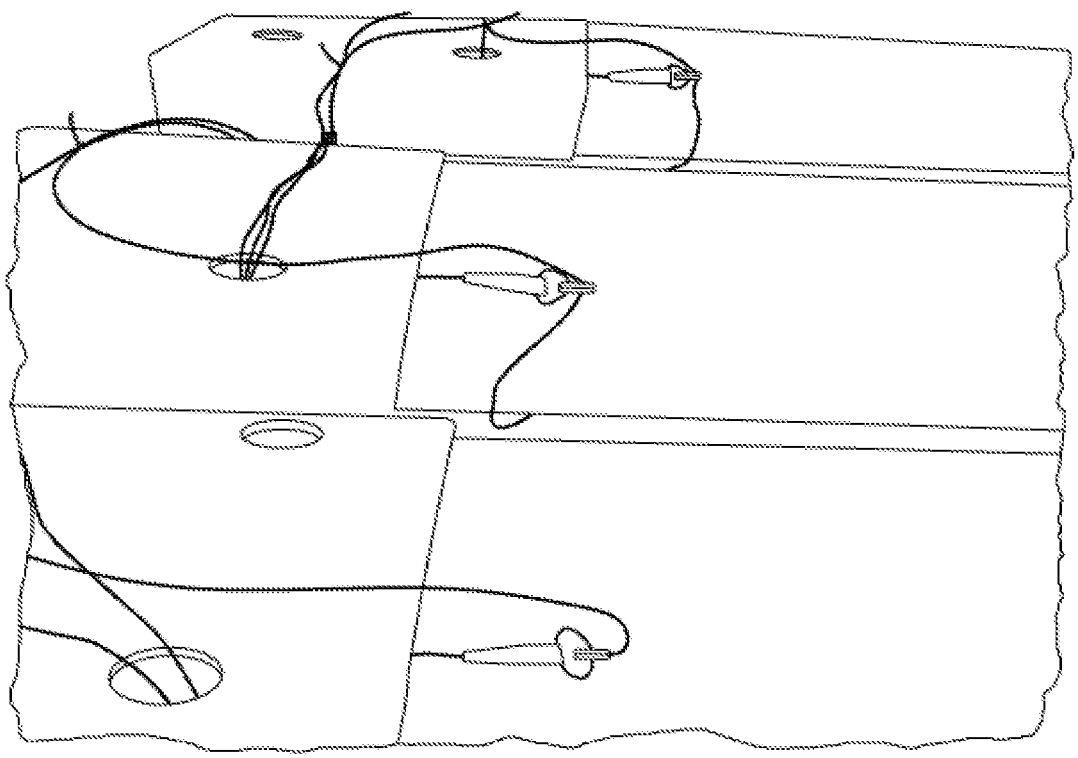
FIG. 7 shows an image of a turbine blade having strain gauges installed, according to an embodiment of the subject invention.

Strain gauges were mounted to the base of each blade, as depicted in the image of FIG. 7. The strain gauges were calibrated and tested to ensure proper function.

The wind turbine was installed in one part, and the electronics were attached and all wires were connected. The wiring was organized using zip ties and electric tape, as seen in part in FIGS. 4-7. All necessary wires and cables were fed up the main tower and into the panel of the wind turbine. In the panel, the cDAQ was stored and the cables were fed through the shaft to the slip ring. Slack was left in the cables so that the turbine was free to rotate into the direction of the wind. For the first test, synthetic jets and vortex generators were deployed using an open loop control system while strain gauge data was measured.

Figure 8:
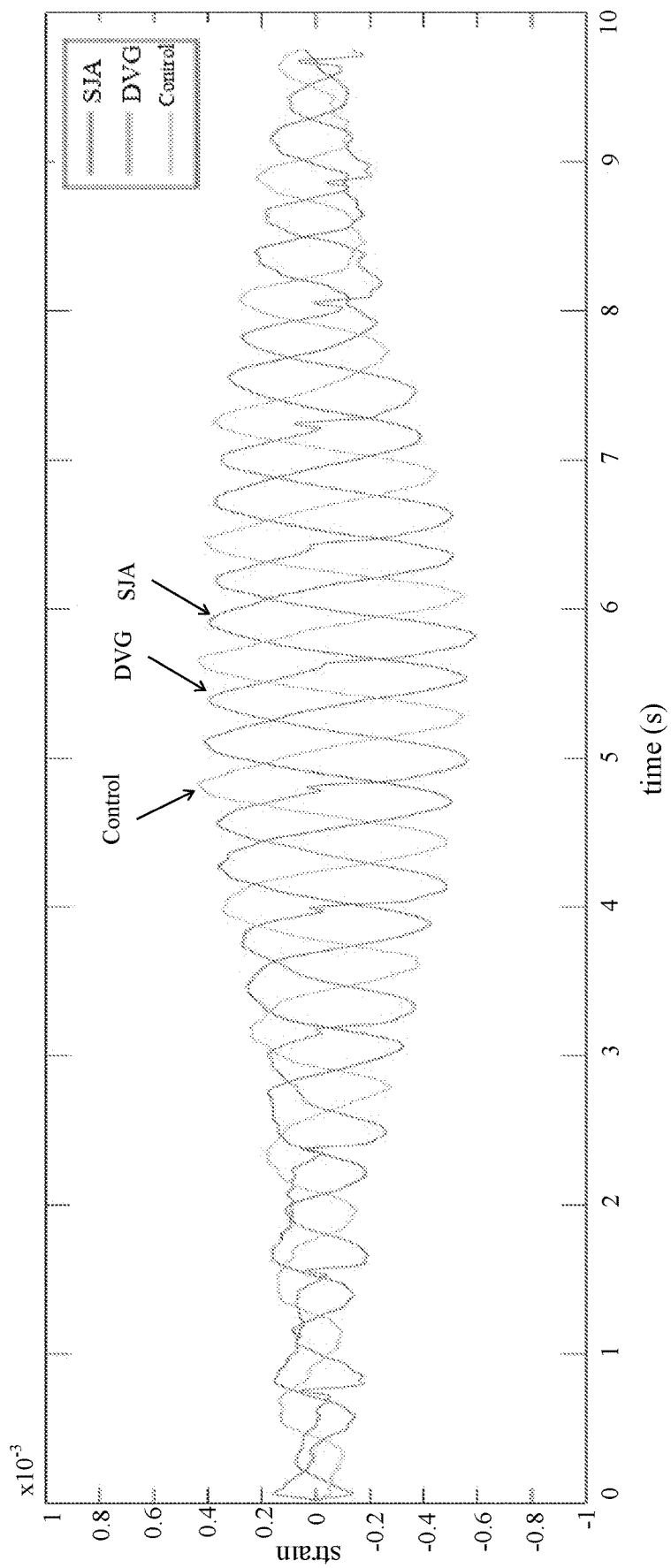
FIG. 8 shows a plot of blade strain, showing a decrease of approximately 10% with flow control devices in use.
Figure 9:
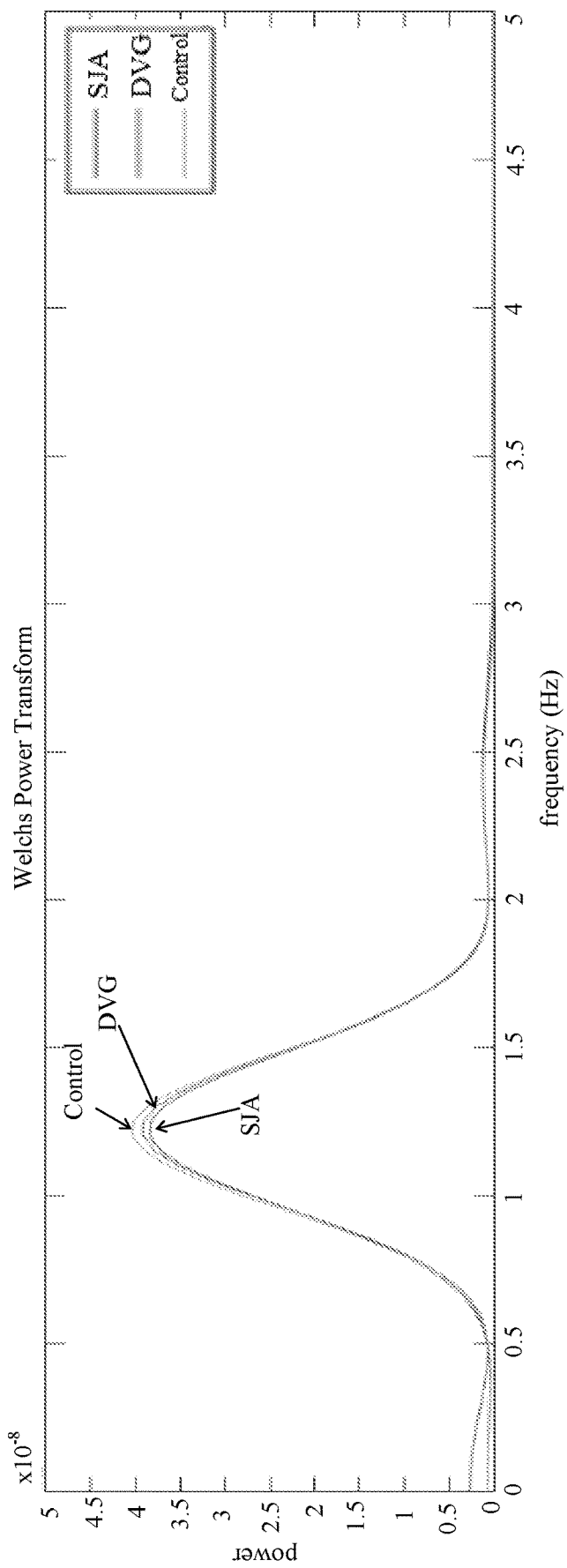
FIG. 9 shows a plot of power versus frequency.
Figure 10:
FIG. 10 shows an image of a turbine blade with tufts flow visualization, with jets off.
Figure 11:

Preliminary data was collected to show that modules could be fit into existing wind turbine designs and monitoring of strain gauges and flow control could be achieved in a closed loop fashion. Preliminary field test results showed that an approximate 10% decrease in blade strain during dynamic pitching/stall was observed with AFC, as shown in FIGS. 8 and 9. In FIGS. 8 and 9, "SJA" shows results for when the synthetic jets were used, "DVG" shows results for when the vortex generators were used, and "Control" shows results for when neither was used. During the testing, tufts of fiber were placed on the blades to add a visual indicator of what was happening during the rotation of the blades. FIG. 10 is an image for when the jets were off, showing the tufts being lifted, which is indicative of separation of the flow over the blade. FIG. 11 is an image from when the jets were on, showing the tufts lying on the blade, indicating the AFC was effective in decreasing the likelihood of dynamic stall.

The testing demonstrated that the modules could be operated in a closed loop fashion and that structural vibration reduction could be achieved through the use of these modules. The use of the tufts, including a video recording, allowed for flow visualization indicating a reduction in flow separation (as compared to when the FCD modules were not active).

Example 4

The wind turbine system from Example 3 was tested again, using tufts of fiber placed on the blades again for visualization. FIGS. 22A-22D are images of tuft flow visualization showing flow separation at an arbitrary location during turbine rotation. Flow control was not active for the images of FIGS. 22A-22D. In order to qualitatively evaluate the effectiveness of flow control to effect flow reattachment during operation of a wind turbine along the blades of the turbine, tuft flow visualization was conducted using Go Pro cameras. FIGS. 22A-22D show four representative frames extracted from the video of tuft flow visualization during the operation of the wind turbine blade. Here, the horizon is used as a visual indicator to select a common portion of the cycle, enabling a comparison to visual evidence collected when the jets are active. A close inspection of the tufts shown in FIGS. 22A-22D shows that the tufts are away from the surface of the blades during this portion of the rotation of the blade, suggesting that the flow is separated. It can be reasonably assumed that this effect is not due to gravity, or a convolution of gravity and centripetal acceleration, due to the direction that the tufts point during the portion of the cycle where the tufts move away from the surface of the wind turbine blades.

FIGS. 23A-23D are images of tuft flow visualization showing how flow control suppressed separation during turbine rotation. Referring to FIGS. 23A-23D, the synthetic jets were activated, and it is clear that the tufts were flat along the surface of the blade, suggesting that the flow is attached. Again, the horizon was used as an indicator to choose a common portion of the cycle to compare with FIGS. 22A-22D. These photos, along with the video from which they originate, are clear visual evidence of the effect that the synthetic jet actuator based flow control had on the mitigation, and potentially elimination, of dynamic stall during rotation, at least at these span-wise locations where tuft flow visualization was conducted.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

Jamieson, P., *Innovation in Wind Turbine Design*, Wiley® 2011.

Reuss, R. L., Hoffman, M. J., & Gergorek, G. M. (1995). Effects of Surface Roughness and Vortex Generators on the NACA 4415 Airfoil. Golden, Colo.: National Renewable Energy Laboratory.

Sareen, A., Deters, R. W., Henry, S. P., & Selig, M. S. (2011). Drag Reduction Using Riblet Film Applied to Airfoils for Wind Turbines. 49th AIAA Aerospace Sciences Meeting, (pp. AIAA 2011-558). Orlando, Fla.

Nakafuji, D. Y., Van Dam, C. P., Smith, R. L., & Collins, S. D. (2001). Active Load Control for Airfoils Using Microtabs. Journal of Solar Energy Engineering, 123(4), 282-289.

Post, M. L., & Corke, T. C. (2006). Separation Control Using Plasma Actuators: Dynamic Stall Vortex Control on Oscillating Airfoil. AIAA Journal, 44(12), 3125-3135.

What is claimed is:

1. A system for reducing structural vibration on a wind turbine blade, the system comprising:
   at least one flow control device (FCD) configured to be installed on a wind turbine blade, at least one of the at least one FCDs comprises a piezoelectric disk and a cavity, and the at least one FCD is capable of injecting momentum into a surrounding fluid through actuation of the piezoelectric disk;
   at least one sensor configured to be installed on a wind turbine blade and to measure strain thereon; and
   a closed loop control system in operable communication with the at least one FCD and the at least one sensor, wherein the closed loop control system comprises a comparator for comparing information received from the at least one sensor to stored information about an acceptable load variation of a wind turbine blade, and
   wherein an actuation frequency of the at least one FCD is chosen based on the dimensions of the cavity of the at least one FCD.

2. The system according to claim 1, wherein the closed loop control system comprises a controller for controlling an input signal provided to the at least one FCD.

3. The system according to claim 2, wherein the input signal is an amplitude of an input voltage.

4. The system according to claim 2, wherein the controller controls the input signal by increasing it, decreasing it, or keeping it steady depending on information received from a comparator of the closed loop control system.

5. The system according to claim 2, wherein the controller modulates, in the frequency domain, a carrier signal used to actuate the at least one FCD.

6. The system according to claim 1, further comprising a wind turbine comprising a plurality of wind turbine blades, each wind turbine blade comprising at least one FCD and at least one sensor installed thereon.

7. The system according to claim 1, wherein at least one of the at least one FCDs is a synthetic jet.

8. The system according to claim 1, wherein at least one of the at least one FCDs is a vortex generator.

9. The system according to claim 1, wherein at least one of the at least one sensors is a strain gauge.

10. The system according to claim 1, wherein at least one of the at least one sensors is an accelerometer.

11. The system according to claim 1, comprising an equal number of FCDs and sensors, wherein each sensor corresponds to and is in operable communication with an FCD, respectively.

12. The system according to claim 1, wherein the at least one sensor provides information about the instantaneous deflection of the blade, on which the sensor is respectively installed, to the closed loop control system.

13. The system according to claim 12, wherein the at least one sensor provides time history information about the amplitude of recent time deflections of the blade to the closed loop control system, and
wherein the at least one sensor provides information about a derivative of a time variance of the deflection of the blade to the closed loop control system.

14. The system according to claim 12, wherein the at least one sensor provides information continuously to the closed loop control system.

15. The system according to claim 12, wherein the closed loop control system uses information provided by the at least one sensor to determine whether and how much to change an input signal to the at least one FCD.

16. The system according to claim 1, wherein, if a wind turbine blade has an increase in load variation in time, the closed loop control system actuates the at least one FCD such that lower variations in load oscillation amplitude result.

17. A method for reducing structural vibration on a wind turbine blade, the method comprising:
   installing the system according to claim 1 on a wind turbine; and
   using the system to reduce structural vibration on wind turbine blades of the wind turbine.

18. A system for reducing structural vibration on a wind turbine blade, the system comprising:
   at least one flow control device (FCD) configured to be installed on a wind turbine blade;
   at least one sensor configured to be installed on a wind turbine blade and to measure strain thereon; and
   a closed loop control system in operable communication with the at least one FCD and the at least one sensor,
   wherein the closed loop control system comprises a comparator for comparing information received from the at least one sensor to stored information about an acceptable load variation of a wind turbine blade,
   wherein the at least one sensor provides information about the instantaneous deflection of the blade, on which the sensor is respectively installed, to the closed loop control system,
   wherein the at least one sensor provides time history information about the amplitude of recent time deflections of the blade to the closed loop control system, and
   wherein the at least one sensor provides information about a derivative of a time variance of the deflection of the blade to the closed loop control system.

19. The system according to claim 18, wherein the at least one sensor provides information continuously to the closed loop control system.

20. The system according to claim 18, wherein the closed loop control system uses information provided by the at least one sensor to determine whether and how much to change an input signal to the at least one FCD.

21. The system according to claim 18, wherein, if a wind turbine blade has an increase in load variation in time, the closed loop control system actuates the at least one FCD such that lower variations in load oscillation amplitude result.

* * * * *